United States Patent
Iwata et al.

(10) Patent No.: US 10,965,493 B2
(45) Date of Patent: Mar. 30, 2021

(54) ON-VEHICLE COMMUNICATION SYSTEM, ON-VEHICLE DEVICE AND COMMUNICATION CONTROL METHOD

(71) Applicants: Sumitomo Electric Industries, Ltd., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihito Iwata, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/606,282

(22) PCT Filed: Feb. 6, 2018

(86) PCT No.: PCT/JP2018/004039
§ 371 (c)(1),
(2) Date: Oct. 18, 2019

(87) PCT Pub. No.: WO2018/193690
PCT Pub. Date: Oct. 25, 2018

(65) Prior Publication Data
US 2020/0195471 A1    Jun. 18, 2020

(30) Foreign Application Priority Data

Apr. 20, 2017 (JP) .............................. JP2017-083810

(51) Int. Cl.
*H04L 12/437* (2006.01)

(52) U.S. Cl.
CPC ................................. *H04L 12/437* (2013.01)

(58) Field of Classification Search
None
See application file for complete search history.

(56) References Cited

U.S. PATENT DOCUMENTS

2020/0107272 A1* 4/2020 He ........................ H04L 5/0053
2020/0128470 A1* 4/2020 Mok ..................... H04W 40/14
(Continued)

FOREIGN PATENT DOCUMENTS

JP         S60-203034 A     10/1985
JP         H11-225095 A      8/1999
(Continued)

*Primary Examiner* — Otis L Thompson, Jr.
(74) *Attorney, Agent, or Firm* — Baker Botts L.L.P.; Michael A. Sartori

(57) ABSTRACT

An on-vehicle communication system is an on-vehicle communication system mounted on a vehicle, comprises: a plurality of on-vehicle devices including a first on-vehicle device and a second on-vehicle device; an acquisition unit that acquires error information concerning an error of data received by the first on-vehicle device from the second on-vehicle device; and a determination unit that performs determination processing of determining whether or not a communication route from the second on-vehicle device to the first on-vehicle device is to be switched to another communication route from the second on-vehicle device to the first on-vehicle device by way of another on-vehicle device based on the error information acquired by the acquisition unit.

5 Claims, 13 Drawing Sheets

(56) References Cited

U.S. PATENT DOCUMENTS

| | | | | |
|---|---|---|---|---|
| 2020/0184818 A1* | 6/2020 | Becker | ................... | G08G 1/04 |
| 2020/0186413 A1* | 6/2020 | Subagio | ................. | H04L 43/16 |
| 2020/0234582 A1* | 7/2020 | Mintz | ................. | G07B 15/063 |

FOREIGN PATENT DOCUMENTS

| | | |
|---|---|---|
| JP | 2013-141048 A | 7/2013 |
| JP | 2015-088815 A | 5/2015 |
| JP | 2016-012932 A | 1/2016 |

* cited by examiner

FIG. 5

Tab1

| DESTINATION MAC ADDRESS | PORT NUMBER OF OUTPUT DESTINATION |
|---|---|
| MAC ADDRESS OF SWITCHING DEVICE 101B | PORT NUMBER OF COMMUNICATION PORT 34B |
| MAC ADDRESS OF IN-VEHICLE COMMUNICATION DEVICE 111 CONNECTED TO SWITCHING DEVICE 101B | PORT NUMBER OF COMMUNICATION PORT 34B |
| MAC ADDRESS OF SWITCHING DEVICE 101C | PORT NUMBER OF COMMUNICATION PORT 34A |
| MAC ADDRESS OF IN-VEHICLE COMMUNICATION DEVICE 111 CONNECTED TO SWITCHING DEVICE 101C | PORT NUMBER OF COMMUNICATION PORT 34A |
| ⋮ | ⋮ |

FIG. 6

Tab2

| DESTINATION MAC ADDRESS | PORT NUMBER OF OUTPUT DESTINATION |
|---|---|
| MAC ADDRESS OF SWITCHING DEVICE 101A | PORT NUMBER OF COMMUNICATION PORT 34B |
| MAC ADDRESS OF IN-VEHICLE COMMUNICATION DEVICE 111 CONNECTED TO SWITCHING DEVICE 101A | PORT NUMBER OF COMMUNICATION PORT 34B |
| MAC ADDRESS OF SWITCHING DEVICE 101B | PORT NUMBER OF COMMUNICATION PORT 34A |
| MAC ADDRESS OF IN-VEHICLE COMMUNICATION DEVICE 111 CONNECTED TO SWITCHING DEVICE 101B | PORT NUMBER OF COMMUNICATION PORT 34A |

⋮ ⋮

ON-VEHICLE COMMUNICATION SYSTEM, ON-VEHICLE DEVICE AND COMMUNICATION CONTROL METHOD

CROSS-REFERENCE TO RELATED APPLICATIONS

This application is the national phase under 35 U. S. C. § 371 of PCT International Application No. PCT/JP2018/004039 which has an International filing date of Feb. 6, 2018 and designated the United States of America.

FIELD

The present disclosure relates to an on-vehicle communication system, an on-vehicle device, a communication control method and a communication control program.

The present application claims the benefit of Japanese Patent Application No. 2017-083810 filed on Apr. 20, 2017, the entire contents of which are herein incorporated by reference.

BACKGROUND

Japanese Patent Application Laid-Open No. 2016-12932 discloses a station side device as described below.
The station side device includes active (in current use) OSUs 1 to N, standby (spare) OSU N+1 and a control unit. The control unit conveys management information on ONUs linked to a logical line to and from a network management system (NMS). The logical line is defined by a fixed combination of an optical line unit and a passive optical network.

Meanwhile, the OSUs acquire management information linked to a real line. The real line indicates an actual combination of the optical line unit and the passive optical network. The control unit converts a line linked to the management information between the logical line and the real line reciprocally by using mapping information.

SUMMARY (1) An on-vehicle communication system according to the present disclosure is an on-vehicle communication system mounted on a vehicle and comprises: a plurality of on-vehicle devices including a first on-vehicle device and a second on-vehicle device; an acquisition unit that acquires error information concerning an error of data received by the first on-vehicle device from the second on-vehicle device; and a determination unit that performs determination processing of determining whether or not a communication route from the second on-vehicle device to the first on-vehicle device is to be switched to another communication route from the second on-vehicle device to the first on-vehicle device by way of another one of the on-vehicle devices, based on the error information acquired by the acquisition unit.

(5) An on-vehicle device according to the present disclosure is an on-vehicle device mounted on a vehicle and comprises: a reception unit that receives data from a target device being another on-vehicle device mounted on the vehicle; a creation unit that creates error information concerning an error of the data received by the reception unit; and a determination unit that determines whether or not a communication route from the target device to the on-vehicle device of itself to another communication route from the target device to the on-vehicle device of itself by way of another on-vehicle device mounted on the vehicle except for the above said another on-vehicle device, based on the error information created by the creation unit.

(6) A communication control method according to the present disclosure is a communication control method in an on-vehicle communication system that is mounted on a vehicle and includes a plurality of on-vehicle devices including a first on-vehicle device and a second on-vehicle device, an acquisition unit and a determination unit and comprises: acquiring by the acquisition unit error information concerning an error of data received by the first on-vehicle device from the second on-vehicle device; and performing, by the determination unit, determination processing of determining whether or not a communication route from the second on-vehicle device to the first on-vehicle device is to be switched to another communication route from the second on-vehicle device to the first on-vehicle device by way of another one of the on-vehicle devices, based on the error information acquired by the acquisition unit.

(7) A communication control program according to the present disclosure is a communication control program used in an on-vehicle communication system that is mounted on a vehicle and includes a plurality of on-vehicle devices causes a computer to function as: a creation unit that creates error information concerning an error of data received from a target device being another on-vehicle device mounted on the vehicle; and a determination unit that determines whether or not a communication route from the target device to the on-vehicle device of itself is to be switched to another communication route from the target device to the on-vehicle device of itself by way of another on-vehicle device mounted on the vehicle except for the above said another on-vehicle device, based on the error information created by the creation unit.

One aspect of the present disclosure may be achieved not only as an on-vehicle communication system having such a characteristic processing unit but also as a semiconductor integrated circuit implementing a part or all of the on-vehicle communication system.

One aspect of the present disclosure may be achieved as an on-vehicle device having such a characteristic processing unit as well as a method including steps for implementing such characteristic processing. Moreover, one aspect of the present disclosure may be achieved as a semiconductor integrated circuit implementing a part or all of the on-vehicle device.

The above and further objects and features will more fully be apparent from the following detailed description with accompanying drawings.

BRIEF DESCRIPTION OF THE DRAWINGS

FIG. 5 is a figure illustrating an example of an ARL table held by a switching unit in the switching device according to Embodiment 1 of the present disclosure.

FIG. 6 is a figure illustrating an example of an ARL table held by a switching unit in the switching device according to Embodiment 1 of the present disclosure.

DETAILED DESCRIPTION

Figure 1:
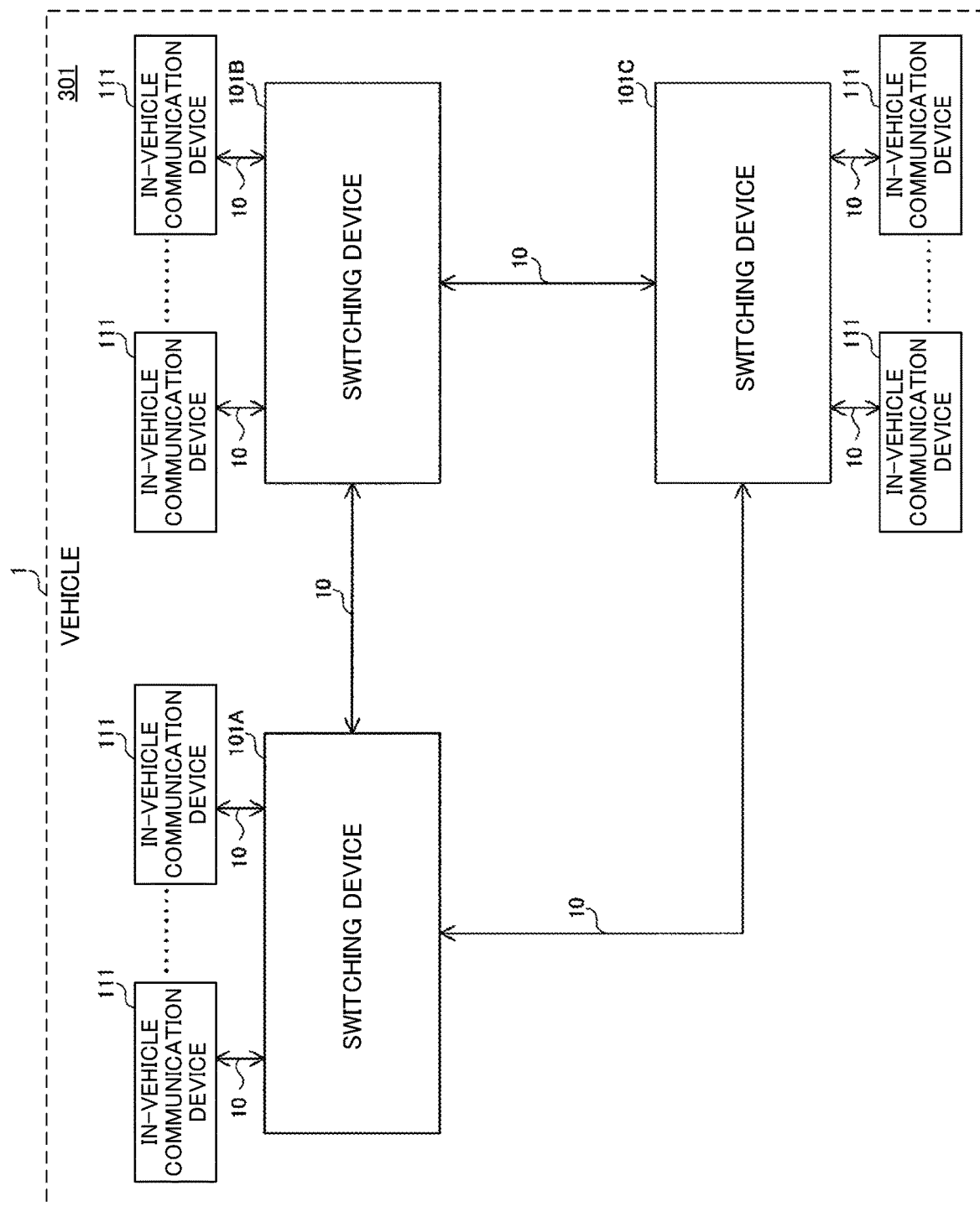
FIG. 1 is a figure illustrating the configuration of an on-vehicle communication system according to Embodiment 1 of the present disclosure.

Conventionally, techniques for performing duplication (redundancy) of a system have been developed in order to offer a high quality service.

For example, applying the redundant configuration described in Japanese Patent Application Laid-Open No. 2016-12932 to an on-vehicle network is conceivable. Due to limitation of space in a vehicle, however, a noise source such as an engine, a motor and so on may be arranged close to signal lines.

Such an arrangement may sharply deteriorate a communication environment depending on the operation of the noise source. For example, the noise level of a signal conveyed through a signal line may sharply be increased, which may prevent the data from being conveyed correctly. Thus, a technique capable of appropriately performing redundant switching in the on-vehicle network with small loss of data is required.

To solve the above-described problems, it is an object of the present disclosure to provide an on-vehicle communication system, an on-vehicle device, a communication control method and a communication control program that are able to appropriately perform redundant switching in the on-vehicle network with small loss of data.

According to the present disclosure, it is possible to appropriately perform redundant switching in the on-vehicle network with small loss of data.

Embodiments of the present disclosure are first listed and described.

(1) The on-vehicle communication system according to an embodiment of the present disclosure is an on-vehicle communication system mounted on a vehicle and comprises: a plurality of on-vehicle devices including a first on-vehicle device and a second on-vehicle device; an acquisition unit that acquires error information concerning an error of data received by the first on-vehicle device from the second on-vehicle device; and a determination unit that performs determination processing of determining whether or not a communication route from the second on-vehicle device to the first on-vehicle device is to be switched to another communication route from the second on-vehicle device to the first on-vehicle device by way of another one of the on-vehicle devices, based on the error information acquired by the acquisition unit.

By such a configuration, it is possible to recognize whether or not loss of data conveyed in a route from the second on-vehicle device to the first on-vehicle device occurs, or whether or not loss of such data is likely to occur, based on the error information, for example. This makes it possible to determine that the communication route is to be switched to another communication route at an appropriate timing when data loss occurs, when data loss is likely to occur or the like. Accordingly, it is possible to appropriately perform redundant switching in the on-vehicle network with small loss of data.

(2) Preferably, the error information includes the number of errors of the data.

Such a configuration makes it possible to more correctly recognize whether or not loss of data conveyed through a route from the second on-vehicle device to the first on-vehicle device occurs based on the number of errors.

(3) Preferably, the error information includes the number of error corrections in error correction processing performed by the first on-vehicle device.

Such a configuration makes it possible to recognize a sign of occurrence of data loss based on the number of error corrections, so that it is possible to more correctly recognize whether or not loss of data conveyed through the route from the second on-vehicle device to the first on-vehicle device is likely to occur. This enables redundant switching before data loss occurs.

(4) Preferably, the determination unit compares a value included in the error information with a predetermined threshold and performs the determination processing based on a comparison result.

This makes it possible to easily recognize whether or not loss of data conveyed in the route from the second on-vehicle device to the first on-vehicle device occurs, or whether or not loss of such data is likely to occur, for example.

(5) The on-vehicle device according to an embodiment of the present disclosure is an on-vehicle device mounted on a vehicle comprises: a reception unit that receives data from a target device being another on-vehicle device mounted on the vehicle; a creation unit that creates error information concerning an error of the data received by the reception unit; and a determination unit that determines whether or not a communication route from the target device to the on-vehicle device of itself is to be switched to another communication route from the target device to the on-vehicle device of itself by way of another on-vehicle device mounted on the vehicle except for the above said another on-vehicle device, based on the error information created by the creation unit.

By such a configuration, it is possible to recognize whether or not loss of data conveyed in a route from the target device to the on-vehicle device of itself occurs, or whether or not loss of such data is likely to occur, based on the error information, for example. This makes it possible to determine that the communication route is to be switched to another communication route at an appropriate timing when data loss occurs, when data loss is likely to occur or the like. Accordingly, it is possible to appropriately perform redundant switching in the on-vehicle network with small loss of data.

(6) The communication control method according to an embodiment of the present disclosure is a communication control method in an on-vehicle communication system that is mounted on a vehicle and includes a plurality of on-vehicle devices including a first on-vehicle device and a second on-vehicle device, an acquisition unit and a determination unit comprises: acquiring by the acquisition unit error information concerning an error of data received by the first on-vehicle device from the second on-vehicle device; and performing, by the determination unit, determination processing of determining whether or not a communication route from the second on-vehicle device to the first on-vehicle device is to be switched to another communication route from the second on-vehicle device to the first on-vehicle device by way of another one of the on-vehicle devices, based on the error information acquired by the acquisition unit.

By such a configuration, it is possible to recognize whether or not loss of data conveyed in a route from the second on-vehicle device to the first on-vehicle device occurs, or whether or not loss of such data is likely to occur, based on the error information, for example. This makes it possible to determine that the communication route is to be switched to another communication route at an appropriate timing when data loss occurs, when data loss is likely to occur or the like. Accordingly, it is possible to appropriately perform redundant switching in the on-vehicle network with small loss of data.

(7) The communication control program according to an embodiment of the present disclosure is a communication control program used in an on-vehicle communication system that is mounted on a vehicle and includes a plurality of on-vehicle devices causes a computer to function as a creation unit that creates error information concerning an error of data received from a target device being another on-vehicle device mounted on the vehicle; and a determination unit that determines whether or not a communication route from the target device to the on-vehicle device of itself is to be switched to another communication route from the target device to the on-vehicle device of itself by way of another on-vehicle device mounted on the vehicle except for the above said another on-vehicle device, based on the error information created by the creation unit.

By such a configuration, it is possible to recognize whether or not loss of data conveyed in a route from the target device to the on-vehicle device of itself occurs, or whether or not loss of such data is likely to occur, based on the error information, for example. This makes it possible to determine that the communication route is to be switched to another communication route at an appropriate timing when data loss occurs, when data loss is likely to occur or the like. Accordingly, it is possible to appropriately perform redundant switching in the on-vehicle network with small loss of data.

The embodiments of the present disclosure will be described below with reference to the drawings thereof. It is noted that the same or corresponding parts are denoted by the same reference codes in the drawings and will not be repeatedly described here. Furthermore, at least parts of the embodiments described below may arbitrarily be combined.

Embodiment 1

FIG. 1 is a figure illustrating the configuration of an on-vehicle communication system according to Embodiment 1 of the present disclosure.

Referring to FIG. 1, an on-vehicle communication system 301 includes switching devices (on-vehicle devices) 101A, 101B and 101C. Hereafter, each of the switching devices 101A, 101B and 101C is also called a switching device 101.

The on-vehicle communication system 301 is mounted on a vehicle 1. Multiple in-vehicle communication devices 111 are mounted on the vehicle 1.

Note that the on-vehicle communication system 301 may include two, or four or more switching devices, though not limited to include three switching devices 101.

The in-vehicle communication device 111 is a telematics communication unit (TCU), a central gateway, a human machine interface, a camera, a sensor, a navigation device or the like and is able to communicate with the switching device 101.

The TCU can wirelessly communicate with a radio base station (not illustrated) device in compliance with a communication standard such as a long term evolution (LTE), 3G, or the like as well as can communicate with the switching device 101.

The central gateway can communicate with the control device, for example, an engine control unit through a controller area network (CAN) and communicate with the switching device 101.

The central gateway performs relay processing of information to be exchanged between the control device and the in-vehicle communication device 111.

The on-vehicle network in the vehicle 1 has a ring topology formed of the three switching devices 101 including the switching devices 101A-101C, for example. The connection between the switching devices 101A-101C and the connection between the switching device 101 and each of the in-vehicle communication devices 111 in the on-vehicle network are fixed.

The switching devices 101A-101C are connected to each other through cables 10 used for on-vehicle Ethernet (registered trademark) communication (hereinafter also referred to as an Ethernet cable). Furthermore, the switching device 101 is connected to the in-vehicle communication device 111 through the Ethernet cable 10, for example.

The switching device 101 can communicate with the in-vehicle communication device 111 directly connected thereto as well as another switching device 101.

More specifically, the switching device 101 and another device directly connected to this switching device 101 exchange information by using an Ethernet frame.

Concretely, the in-vehicle communication device 111 transmits an Ethernet frame to another in-vehicle communication device 111 through one or more switching devices 101, for example.

The Ethernet frame includes, for example, the media access control (MAC) address of this in-vehicle communication device 111 as a source MAC address and the MAC address of another in-vehicle communication device 111 as a destination MAC address.

The switching device 101 is specifically a layer 2 (L2) switch. When receiving an Ethernet frame from the in-vehicle communication device 111, the switching device 101 performs relay processing of referring to a destination MAC address included in the received Ethernet frame and transmitting the Ethernet frame to another switching device 101 or the in-vehicle communication device 111 designated as a destination according to the referred destination MAC address. The details of relay processing will be described later.

[Problem]

The environments of the switching devices 101A-101C are often different from one another. For example, the switching devices 101A-101C are provided at different positions, such as at a dashboard of the vehicle, at the front and rear portions of the vehicle and so on, so that they have different ambient temperatures.

The Ethernet cables 10 connecting the switching devices 101 are affected by, for example, low-frequency noise from the engine, clock noise from each of the devices or the like. Such noise may abruptly or constantly occur.

The Ethernet cable 10 may receive noise depending on the positional relationship between a noise source and the cable itself. This causes noise to be superposed on signals conveyed between the switching devices 101, so that degradation of signal quality may constantly or abruptly occur. Thus, data may not correctly be conveyed in the on-vehicle network.

Hence, the on-vehicle communication system according to embodiments of the present disclosure solves these problems by the following configuration and operation.

[Configuration of Switching Device 101]

Figure 2:
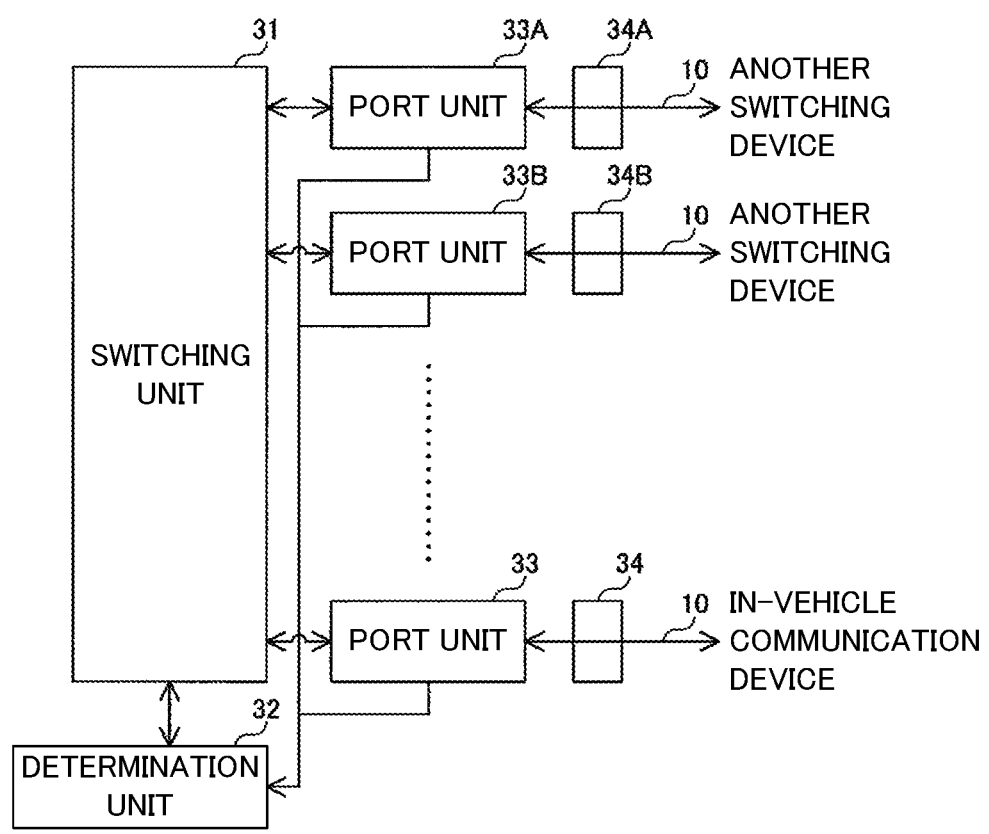
FIG. 2 is a figure illustrating the configuration of a switching device in the on-vehicle communication system according to Embodiment 1 of the present disclosure.

FIG. 2 is a figure illustrating the configuration of the switching device in the on-vehicle communication system according to Embodiment 1 of the present disclosure.

Referring to FIG. 2, the switching device 101 includes a switching unit 31, a determination unit 32, multiple port units 33 and multiple communication ports 34.

Each of the communication ports 34 is a component such as a connector to which an Ethernet cable 10, for example, can be connected. Note that the communication port 34 may be a terminal of an integrated circuit. The Ethernet cable 10 is connected to each of the communication ports 34.

The port unit 33 is provided in correspondence to the communication port 34. The port unit 33 and the corresponding communication port 34 are assigned with a unique port number.

In this example, the communication ports 34A and 34B, which are examples of the communication ports 34, are connected to other switching devices 101 through the Ethernet cables 10. Another communication port 34 out of the multiple communication ports 34 other than the communication ports 34A and 34B is connected to the in-vehicle communication device 111 through the Ethernet cable 10. Furthermore, port units 33A and 33B, which are examples of the port units 33, correspond to the communication ports 34A and 34B, respectively.

When receiving an Ethernet frame from another switching device 101 or the in-vehicle communication device 111 through the communication port 34, the port unit 33 processes the received Ethernet frame and outputs the processed Ethernet frame to the switching unit 31.

Meanwhile, when receiving an Ethernet frame from the switching unit 31, the port unit 33 processes the received Ethernet frame and transmits the processed Ethernet frame to another switching device 101 or the in-vehicle communication device 111 through the corresponding communication port 34. The details of the operation of the port unit 33 will be described in detail later.

The switching unit 31 operates as an L2 switch, for example, and, when receiving an Ethernet frame from the port unit 33, refers to the destination MAC address included in the received Ethernet frame.

The switching unit 31 holds an address resolution logic (ARL) table indicating a correspondence between the destination MAC address and the port number of the communication port 34 designated as an output destination.

The content of the ARL table is set in advance by the user, for example, based on the above-mentioned fixed connection relationship.

The switching unit 31 acquires the port number corresponding to the destination MAC address referred to from the ARL table and transmits the received Ethernet frame to another switching device 101 or the in-vehicle communication device 111 through the port unit 33 and the communication port 34 corresponding to the acquired port number.

Note that the switching unit 31 may also be operated as a layer 3 (L3) switch.

Figure 3:
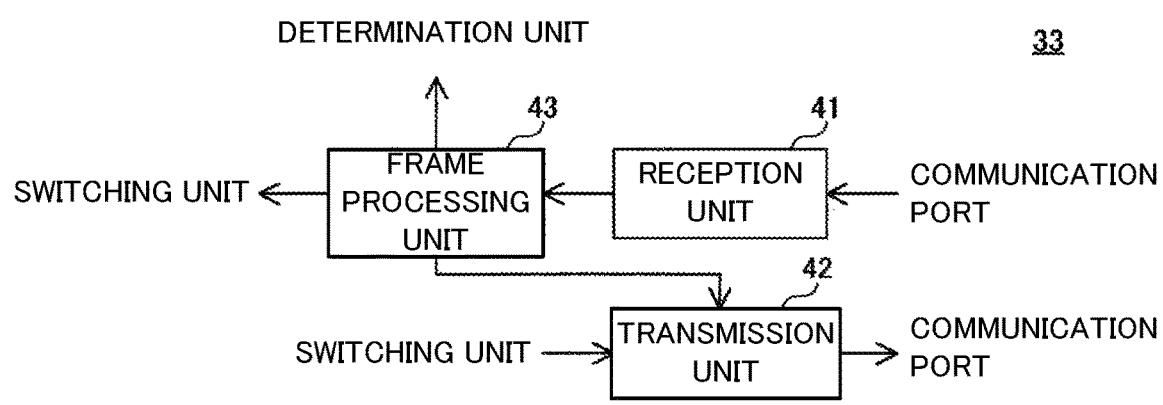
FIG. 3 is a figure illustrating the configuration of a port unit of the switching device according to an embodiment 1 of the present disclosure.

FIG. 3 is a figure illustrating the configuration of a port unit of the switching device according to Embodiment 1 of the present disclosure.

Referring to FIG. 3, the port unit 33 includes a reception unit 41, a transmission unit 42 and a frame processing unit (acquisition unit and creation unit) 43.

If transmitting and receiving Ethernet frames at a communication rate of 100 megabits per second (Mbps) in accordance with a predetermined communication standard, the port unit 33 executes the following processing.

That is, when receiving an Ethernet frame from the switching unit 31, the transmission unit 42 in the port unit 33 calculates a cyclic redundancy check (CRC) value of the data included in the received Ethernet frame and stores the calculated CRC value in a frame check sequence (FCS) field, for example, of this Ethernet frame.

The transmission unit 42 then converts a bit string indicating the Ethernet frame into a string of symbols in accordance with a predetermined modulation technique.

The transmission unit 42 modulates a carrier wave from the first symbol of the converted string of symbols in order in correspondence with the symbol to thereby generate an electrical signal and transmits the generated electrical signal to another switching device 101 or the in-vehicle communication device 111 connected through the corresponding communication ports 34.

The reception unit 41 receives data from a target device, which is another switching device 101. More specifically, when receiving an electric signal from the target device or the in-vehicle communication device 111 connected through the corresponding communication port 34, the reception unit 41 demodulates the electric signal in accordance with a predetermined modulation technique to thereby generate a string of symbols. The reception unit 41 outputs the generated string of symbols to the frame processing unit 43.

The frame processing unit 43 acquires error information E1 concerning an error of the data received by the reception unit 41.

Specifically, the frame processing unit 43 creates error information E1 including the number of CRC errors in multiple Ethernet frames received per predetermined unit time, for example.

More specifically, when receiving a string of symbols from the reception unit 41, the frame processing unit 43 converts the received string of symbols into a bit string. The converted bit string indicates an Ethernet frame.

The frame processing unit 43 performs CRC check on the converted bit string, that is, the Ethernet frame. More specifically, the frame processing unit 43 acquires a CRC value from the FCS field of the Ethernet frame.

Furthermore, the frame processing unit 43 calculates a CRC value of the data included in the Ethernet frame and compares, that is, checks the calculated CRC value with the acquired CRC value.

If these CRC values match with each other, the frame processing unit 43 determines that the data is correct and outputs the Ethernet frame to the switching unit 31.

If, on the other hand, these CRC values do not match with each other, the frame processing unit 43 determines that the data is in error, discards the Ethernet frame and transmits a resend request of the Ethernet frame to the target device or the in-vehicle communication device 111 via the transmission unit 42, for example.

The frame processing unit 43 totalizes the number of frames that are determined to be in error every time a predetermined unit of time has elapsed, and creates error information E1 including the totalized result, that is, the number of CRC error occurrences per unit of time (hereinafter also referred to as the number of CRC errors), for example. The frame processing unit 43 outputs the created error information E1 to the determination unit 32.

Figure 4:
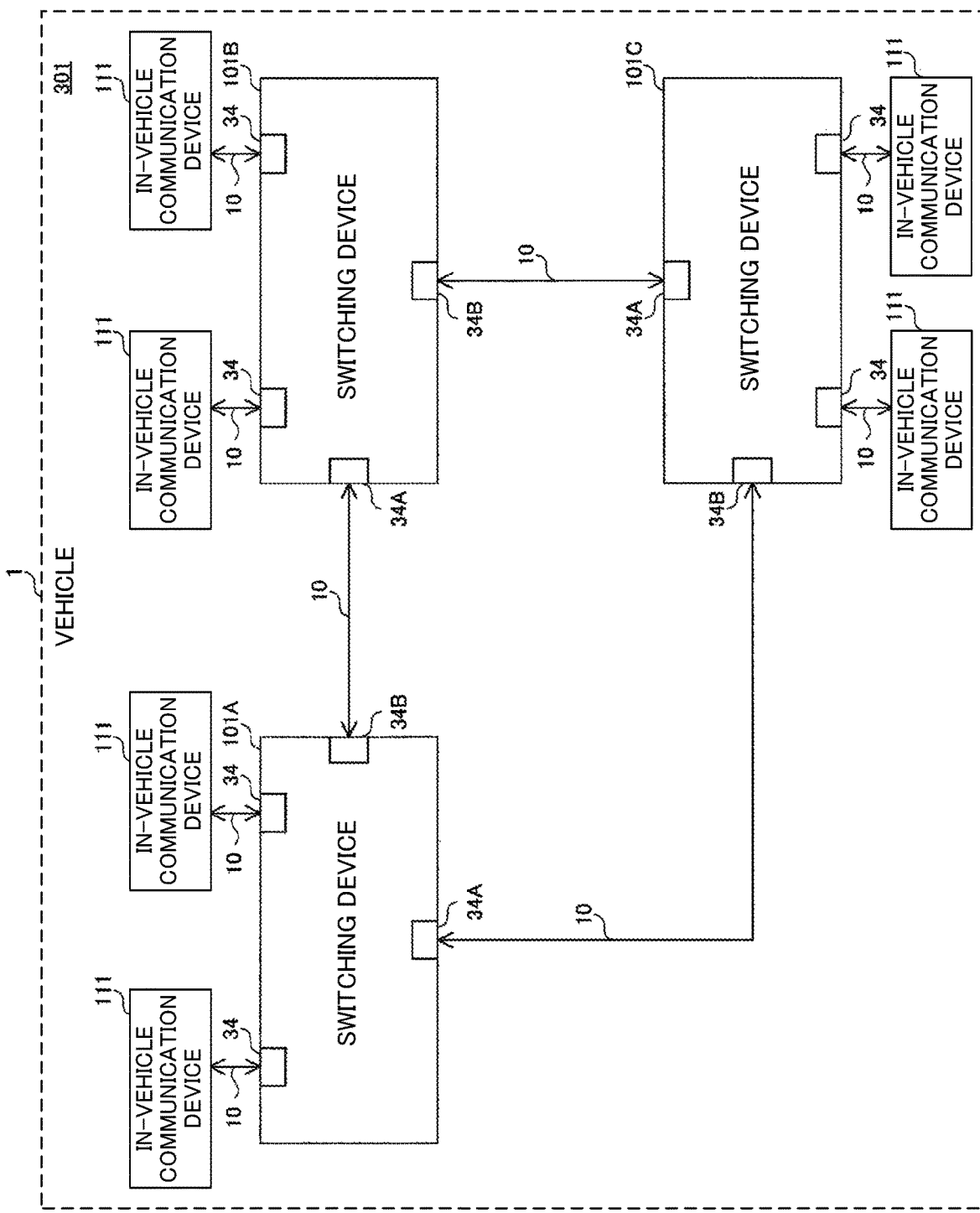
FIG. 4 is a figure illustrating an example of a connection between switching devices in the on-vehicle communication system according to Embodiment 1 of the present disclosure.

FIG. 4 is a figure illustrating an example of a connection between the switching devices in the on-vehicle communication system according to Embodiment 1 of the present disclosure. FIG. 4 illustrates the switching devices 101A-101C each having communication ports 34A and 34B used for communication between the switching devices as well as two communication ports 34 used for communication between the switching device 101 and the in-vehicle communication device 111.

Referring to FIG. 4, the communication port 34B of the switching device 101A is connected to the communication port 34A of the switching device 101B through the Ethernet cable 10. The communication port 34B of the switching device 101B is connected to the communication port 34A of the switching device 101C through the Ethernet cable 10. The communication port 34B of the switching device 101C is connected to the communication port 34A of the switching device 101A through the Ethernet cable 10.

[Creation and Transmission of Determination Information]

Referring to FIGS. 2 and 4, determination information creation and transmission processing performed in the switching device 101B will be described below while similar creation and transmission processing is performed in each of the switching devices 101A and 101C.

The determination unit 32 in the switching device 101B performs determination processing for determining whether or not a communication route from the target device to the switching device 101B of its own is to be switched to another communication route from the target device to the switching device 101B of its own by way of another switching device 101 based on the error information E1 created by the frame processing unit 43.

More specifically, the determination unit 32 compares the value included in the error information E1 and a predetermined threshold Th1 and performs the determination processing based on the comparison result.

More specifically, the determination unit 32 holds type information indicating a correspondence between an MAC address and the type of the device such as a switching device or an in-vehicle communication device.

The determination unit 32 refers to the ARL table held in the switching unit 31, and recognizes that the types of the devices to which the port units 33A and 33B are connected through the respective communication ports 34A and 34B are switching devices based on the ARL table and the type information.

The determination unit 32 performs determination processing of error information E1 output from the port units 33A and 33B connected to the switching device.

More specifically, the determination unit 32 receives error information E1 output from the port unit 33A connected to the switching device. If the number of CRC errors NA1 included in the received error information E1 is equal to or more than the threshold Th1, the determination unit 32 determines that a communication route from the target device, i.e., the switching device 101A to the switching device 101B of its own is to be switched to a communication route from the switching device 101A to the switching device 101B of its own by way of the switching device 101C.

The determination unit 32 creates determination information ACB indicating the determination result and directly transmits the created determination information ACB to the switching device 101A via the switching unit 31, the port unit 33A and the communication port 34A.

Note that the determination unit 32 may transmit the created determination information ACB to the switching device 101A via the switching unit 31, the port unit 33B, the communication port 34B and the switching device 101C since data is highly likely not to be transmitted well between the switching devices 101A and 101B. Alternatively, the determination unit 32 may both directly transmit the determination information ACB to the switching device 101A and transmit the determination information ACB to the switching device 101A by way of the switching device 101C.

Furthermore, the determination unit 32 receives error information E1 output from the port unit 33B connected to the switching device. If the number of CRC errors NB1 included in the received error information E1 is equal to or more than the threshold Th1, the determination unit 32 determines that a communication route from the target device, i.e., the switching device 101C to the switching device 101B of its own is to be switched to a communication route from the switching device 101C to the switching device 101B of its own by way of the switching device 101A.

The determination unit 32 creates determination information CAB indicating the determination result and directly transmits the created determination information CAB to the switching device 101C via the switching unit 31, the port unit 33B and the communication port 34B.

Note that the determination unit 32 may transmit the created determination information CAB to the switching device 101C via the switching unit 31, the port unit 33A, the communication port 34A and the switching device 101A since the data is highly likely not to be transmitted well between the switching devices 101C and 101B. Alternatively, the determination unit 32 may both directly transmit the determination information CAB to the switching device 101C and transmit the determination information CAB to the switching device 101C by way of the switching device 101A.

Moreover, if the number of CRC errors included in the error information E1 output from the port unit 33A and the number of CRC errors included in the error information E1 output from the port unit 33B are both equal to or more than the threshold Th1, the determination unit 32 performs the following processing.

That is, the determination unit 32 does not use the error information E1 less in the number of CRC errors, for example.

More specifically, if the number of CRC errors included in the error information E1 output from the port unit 33B is less than the number of CRC errors included in the error information E1 output from the port unit 33A, the determination unit 32 uses the error information E1 output from the port unit 33A while it does not use the error information E1 output from the port unit 33B.

The determination unit 32 then determines that a communication route from the switching device 101A to the switching device 101B of its own is to be switched to a communication route from the switching device 101A to the switching device 101B of its own by way of the switching device 101C whereas it does not determine that a communication route from the switching device 101C to the switching device 101B of its own is to be switched to a communication route from the switching device 101C to the switching device 101B of its own by way of the switching device 101A.

Note that the determination unit 32 may be configured not to determine the switching of the communication route if both of the number of CRC errors included in the error information E1 output from the port unit 33A and the number of CRC errors included in the error information E1 output from the port unit 33B are both equal to or more than the threshold Th1.

[Reception of Determination Information]

Determination information reception processing and communication route change processing to be performed in the switching devices 101A and 101C will be described below while similar reception processing and communication route change processing are also performed in the switching device 101B.

[Processing in Switching Device 101A]

FIG. 5 is a figure illustrating an example of an ARL table held by a switching unit in the switching device according to Embodiment 1 of the present disclosure.

Referring to FIG. 5, the switching unit 31 in the switching device 101A holds an ARL table Tab1 indicating a correspondence between a destination MAC address and a port number of the communication port 34 designated as an output destination.

In the ARL table Tab1, the MAC address of the switching device 101B and the MAC address of the in-vehicle communication device 111 connected to the switching device 101B are brought into correspondence with the port number of the communication port 34B.

Furthermore, in the ARL table Tab1, the MAC address of the switching device 101C and the MAC address of the in-vehicle communication device 111 connected to the switching device 101C are brought into correspondence with the port number of the communication port 34A.

Although not illustrated, in the ARL table Tab1, the MAC address of the in-vehicle communication device 111 connected to the switching device 101A is brought into correspondence with the port number of the communication port 34 different from the communication ports 34A and 34B.

Referring again to FIG. 3, when receiving determination information ACB from the switching device 101B through the communication port 34B and the reception unit 41, the frame processing unit 43 in the port unit 33B outputs the received determination information ACB to the determination unit 32.

Referring again to FIG. 2, when receiving the determination information ACB from the port unit 33B, the determination unit 32 recognizes that a communication route from the switching device 101A of its own to the switching device 101B is to be switched to a communication route from the switching device 101A of its own to the switching device 101B by way of the switching device 101C based on the received determination information ACB.

More specifically, the determination unit 32 rewrites the ARL table Tab1 held by the switching unit 31 as described below.

That is, the determination unit 32 rewrites, in the ARL table Tab1, each of the port numbers corresponding to the MAC address of the switching device 101B and the MAC address of the in-vehicle communication device 111 connected to the switching device 101B to the port number of the communication port 34A from the port number of the communication port 34B.

Thus, the Ethernet frame to be conveyed from the switching device 101A to the switching device 101B is conveyed from the switching device 101A to the switching device 101B by way of the switching device 101C, that is the communication route is switched.

[Processing in Switching Device 101C]

FIG. 6 is a figure illustrating an example of an ARL table held by a switching unit in the switching device according to Embodiment 1 of the present disclosure.

Referring to FIG. 6, the switching unit 31 of the switching device 101C holds an ARL table Tab2 indicating a correspondence between a destination MAC address and the port number of the communication port 34 designated as an output destination.

In the ARL table Tab 2, the MAC address of the switching device 101A and the MAC address of the in-vehicle communication device 111 connected to the switching device 101A are brought into correspondence with the port number of the communication port 34B.

Furthermore, in the ARL table Tab 2, the MAC address of the switching device 101B and the MAC address of the in-vehicle communication device 111 connected to the switching device 101B are brought into correspondence with the port number of the communication port 34A.

Although not illustrated, in the ARL table Tab2, the MAC address of the in-vehicle communication device 111 connected to the switching device 101C is brought into correspondence with the port number of the communication port 34 different from the communication ports 34A and 34B.

Referring again to FIG. 3, when receiving determination information CAB from the switching device 101B through the communication port 34A and the reception unit 41, the frame processing unit 43 in the port unit 33A outputs the received determination information CAB to the determination unit 32.

Referring again to FIG. 2, when receiving the determination information CAB from the port unit 33A, the determination unit 32 recognizes that the communication route from the switching device 101C of its own to the switching device 101B is to be switched to a communication route from the switching device 101C of its own to the switching device 101B by way of the switching device 101A based on the received determination information CAB.

More specifically, the determination unit 32 rewrites the ARL table Tab2 held by the switching unit 31 as described below.

That is, the determination unit 32 rewrites, in the ARL table Tab2, each of the port numbers corresponding to the MAC address of the switching device 101B and the MAC address of the in-vehicle communication device 111 connected to the switching device 101B to the port number of the communication port 34B from the port number of the communication port 34A.

Thus, the Ethernet frame to be conveyed from the switching device 101C to the switching device 101B is conveyed from the switching device 101C to the switching device 101B by way of the switching device 101A, that is, the communication route is switched.

[Modification of Switching Device 101]

Referring again to FIG. 2, the switching device 101 is not limited to transmit and receive Ethernet frames at a communication rate of 100 Mbps in accordance with a predetermined communication standard. The switching device 101 may transmit and receive Ethernet frames at a communication rate of 1 gigabit per second (Gbps).

In this example, in a destination device to which an Ethernet frame is to be transmitted, a forward error correction (FEC) and a CRC check are performed.

Referring again to FIG. 3, when receiving an Ethernet frame of 1518 bytes in size, for example, from the switching unit 31, the transmission unit 42 in the modification of the switching device 101 calculates a CRC value of the data included in the received Ethernet frame and stores the calculated CRC value in the FCS field of the Ethernet frame.

The transmission unit 42 then converts a bit string indicating the Ethernet frame into a string of symbols in accordance with the modulation technique of PAM3, for example. Here, the transmission unit 42 performs the conversion by using symbols each including three bits.

The transmission unit 42 makes the converted string of symbols redundant. More specifically, the transmission unit 42 divides the converted string of symbols every 188 symbols to thereby create multiple pre-coding data.

The transmission unit 42 creates (204, 188) Reed-Solomon codes based on the created pre-coding data.

Here, for (x, y) Reed-Solomon code, x represents the total number of symbols obtained by summing pre-coding data and redundant information while y represents the number of symbols for the pre-coding data. Accordingly, the value obtained by subtracting y from x is the number of symbols for the redundant information.

More specifically, the transmission unit 42 adds 51 symbols of zero data to the head of the pre-coding data to thereby create 239 symbols of data and encodes the created 239 symbols of data into Reed-Solomon (255, 239) codes.

The transmission unit 42 then removes 51 symbols of the head data from the Reed-Solomon (255, 239) codes to thereby create Reed-Solomon (204, 188) codes.

For example, for the Reed-Solomon (204, 188) codes, up to 8 symbols obtained by dividing 16 by 2 out of 188 symbols of the pre-coding data can be corrected by the Reed-Solomon code.

The transmission unit 42 modulates a carrier signal from the first symbol of each of the created multiple Reed-Solomon (204, 188) codes in order in correspondence with the symbol to thereby generate an electrical signal and transmits the generated electrical signal to another switching device 101 or the in-vehicle communication device 111 that is connected through the corresponding communication port 34.

When receiving the electrical signal from the target device or the in-vehicle communication device 111 that is connected through the corresponding communication port 34, the reception unit 41 demodulates the electrical signal in accordance with the modulation technique of PAM3 to thereby generate a string of symbols. The reception unit 41 outputs the generated string of symbols to the frame processing unit 43.

The frame processing unit 43 creates error information E2 including the number of error corrections in the error correction processing performed by the switching device 101 of its own, for example.

Specifically, the frame processing unit 43 creates the error information E2 including the number of error corrections in the string of symbols received by the reception unit 41, for example.

More specifically, when receiving the string of symbols from the reception unit 41, the frame processing unit 43 converts the received string of symbols, i.e., multiple Reed-Solomon (204, 188) codes into a plurality of pre-coding data.

When converting the multiple Reed-Solomon (204, 188) codes into the multiple pre-coding data, the frame processing unit 43 records the total number of error correcting times and creates the error information E2 including the recorded total number of error correcting times, that is, the number of error correcting times per frame (hereinafter simply referred to as error correcting times). The frame processing unit 43 outputs the created error information E2 to the determination unit 32.

The frame processing unit 43 combines the converted multiple pre-coding data with each other to generate a string of symbols and converts the generated string of symbols to a bit string. Here, the converted bit string represents 1518 bytes in size of an Ethernet frame.

The frame processing unit 43 acquires a CRC value from the converted bit string, i.e., the FCS field of the Ethernet frame.

Furthermore, the frame processing unit 43 calculates a CRC value of the data included in the Ethernet frame and compares, that is, checks the calculated CRC value with the acquired CRC value.

If these CRC values match with each other, the frame processing unit 43 outputs the Ethernet frame to the switching unit 31.

If, on the other hand, these CRC values do not match with each other, the frame processing unit 43 transmits a resend request of the Ethernet frame to another switching device 101 or the in-vehicle communication device 111 through the transmission unit 42, for example.

Note that the frame processing unit 43 is not limited to output the error information E2 including the number of error correcting times to the determination unit 32. The frame processing unit 43 may alternatively output the error information E2 including the number of error correcting times and the result of the CRC check to the determination unit 32.

Referring again to FIGS. 2 and 4, determination information creation and transmission processing performed in the switching device 101B will be described below while similar creation and transmission processing is also performed in the switching devices 101A and 101C.

The determination unit 32 in the switching device 101B refers to the ARL table held in the switching unit 31, and recognizes that the types of the devices to which the port units 33A and 33B are connected through the respective communication ports 34A and 34B are switching devices based on the ARL table and the type information.

The determination unit 32 performs determination processing about the error information E2 output from the port units 33A and 33B connected to the switching devices.

More specifically, the determination unit 32 compares the number of error correcting times included in the error information E2 and a predetermined threshold Th2 based on an error correction capability of Reed-Solomon (204, 188) codes, and performs determination processing based on the comparison result.

If the Reed-Solomon (204, 188) codes are used, error correction can be made up to 65 bytes or so obtained by multiplying 1518 by (8/188) for the Ethernet frame of 1518 bytes in size. If the user thus allows an error correction up to 50 bytes, 133 obtained by multiplying 50 by (8/3) as the number of corrections corresponding to 50 bytes of error correction is set as a threshold Th2.

If receiving the error information E2 output from the port unit 33A connected to the switching device and recognizing that the number of error correcting times NA2 included in the received error information E2 is equal to or more than the threshold Th2, the determination unit 32 determines that the communication route from the target device, i.e., the switching device 101A to the switching device 101B of its own is to be switched to the communication route from the switching device 101A to the switching device 101B of its own by way of the switching device 101C.

The determination unit 32 creates determination information ACB indicating the determination result and directly transmits the created determination information ACB to the switching device 101A via the switching unit 31, the port unit 33A and the communication port 34A.

Meanwhile, if receiving the error information E2 output from the port unit 33B connected to the switching device and recognizing that the number of error correcting times NB2 included in the received error information E2 is equal to or more than the threshold Th2, the determination unit 32 determines that the communication route from the target device, i.e., the switching device 101C to the switching device 101B of its own is to be switched to a communication route from the switching device 101C to the switching device 101B of its own by way of the switching device 101A.

The determination unit 32 creates determination information CAB indicating the determination result and directly transmits the created determination information CAB to the switching device 101C via the switching unit 31, the port unit 33B and the communication port 34B.

If the number of error correcting times included in the error information E2 output from the port unit 33A and the number of error correcting times included in the error information E2 output from the port unit 33B are both equal to or more than the threshold Th2, the determination unit 32 performs the following processing.

That is, the determination unit 32 does not use the error information E2 being less in the number of error correcting times, for example.

More specifically, if the number of error correcting times included in the error information E2 output from the port unit 33B is less than the number of error correcting times included in the error information E2 output from the port unit 33A, the determination unit 32 uses the error information E2 output from the port unit 33A while it does not use the error information E2 output from the port unit 33B.

The determination unit 32 then determines that the communication route from the switching device 101A to the switching device 101B of its own is to be switched to a communication route from the switching device 101A to the switching device 101B of its own by way of the switching device 101C while it does not determine that the communication route from the switching device 101C to the switching device 101B of its own is to be switched to the communication route from the switching device 101C to the communication route 101B of its own by way of the switching device 101A.

Note that if both of the number of error correcting times included in the error information E2 output from the port unit 33A and the number of error correcting times included in the error information E2 output from the port unit 33B are equal to or more than the threshold Th2, the determination unit 32 may be configured not to determine the switching of the communication route.

In the modification of the switching device 101, the determination unit 32 is configured to determine the switching of the communication route based on the number of error correcting times, though the configuration is not limited thereto. The determination unit 32 may be configured to determine the switching of the communication route based on the number of error correcting times and the number of CRC errors. More specifically, the determination unit 32 calculates the number of CRC errors by totalizing the results of CRC check included in the error information E2, for example. The determination unit 32 then determines that the communication route is to be switched if the number of error correcting times is equal to or more than the threshold Th2 or if the number of CRC errors is equal to or more than a threshold Th1.

Furthermore, in the modification of the switching device 101, Ethernet frames are not limited to be transmitted and received at a communication rate of 1 Gbps. Ethernet frames may be transmitted and received at both of the communication rates of 1 Gbps and 100 Mbps.

Moreover, in the modification of the switching device 101, the determination unit 32 is configured to fixedly use the set threshold Th2 though the configuration is not limited thereto. The determination unit 32 may be configured to dynamically use the threshold Th2. More specifically, the determination unit 32 learns the relationship between the number of error correcting times and the number of CRC errors, calculates the number of error correcting times free of the occurrence of CRC errors based on the learning result and dynamically sets the threshold Th2 based on the calculation result.

[Flow of Operation]

Each device in the on-vehicle communication system 301 includes a computer, and a computation processing unit such as a CPU in the computer reads out programs including a part or all of the steps in a sequence diagram or a flowchart as described below from a memory not illustrated and executes the same. These programs of the multiple devices may be installed from the external device. Alternatively, these programs of the multiple devices may be distributed while being stored in a recording medium.

Figure 7:
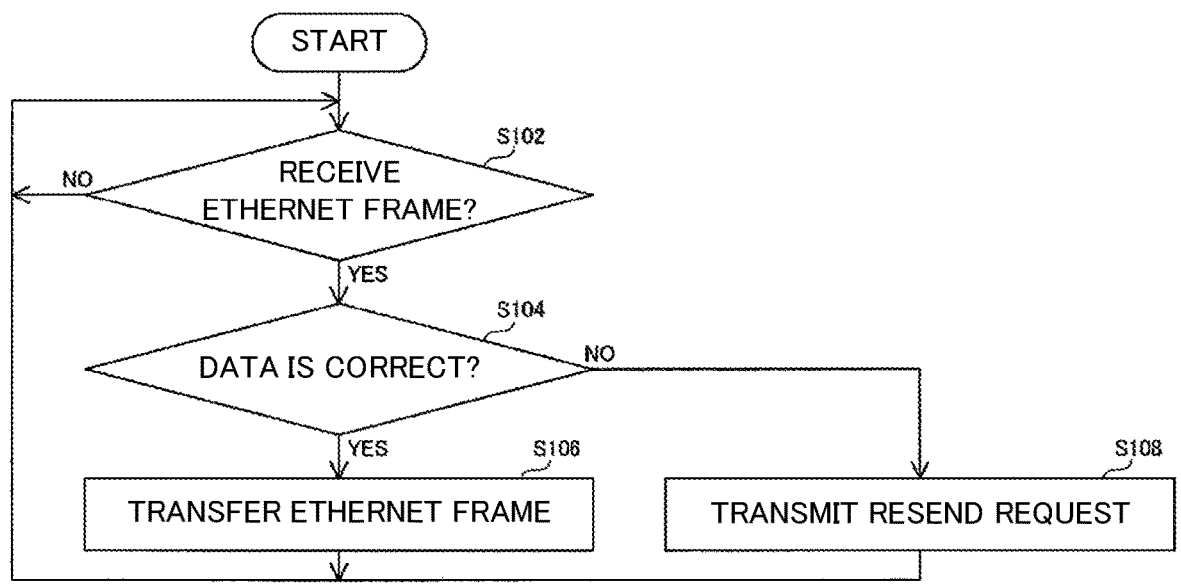
FIG. 7 is a flowchart of an operational procedure performed when the switching device in the on-vehicle communication system according to Embodiment 1 of the present disclosure receives an Ethernet frame.

FIG. 7 is a flowchart of an operational procedure performed when the switching device in the on-vehicle communication system according to Embodiment 1 of the present disclosure receives an Ethernet frame.

FIG. 7 indicates the flow of operation in the switching device 101 that transmits and receives Ethernet frames at a communication rate of 100 Mbps.

Referring to FIG. 7, the switching device 101 is first held standby until it receives an Ethernet frame from a target device or the in-vehicle communication device 111 (NO at step S102).

When receiving an Ethernet frame from the target device or the in-vehicle communication device 111 (YES at step S102), the switching device 101 then determines whether or not the data included in the Ethernet frame is correct based on the CRC value included in the received Ethernet frame (step S104).

If determining that the data included in the Ethernet frame is correct (YES at step S104), the switching device 101 transmits, that is, transfers the Ethernet frame to the switching device 101 or the in-vehicle communication device 111 using the destination MAC address included in the Ethernet frame (step S106).

If, on the other hand, determining that the data included in the Ethernet frame is in error (NO at step S104), the switching device 101 discards this Ethernet frame and transmits a resend request to the source device of this Ethernet frame (step S108).

Next, when transferring the Ethernet frame (step S106), or transmitting a resend request (step S108), the switching device 101 is held standby until it receives a new Ethernet frame from the target device or the in-vehicle communication device 111 (NO at step S102).

Figure 8:
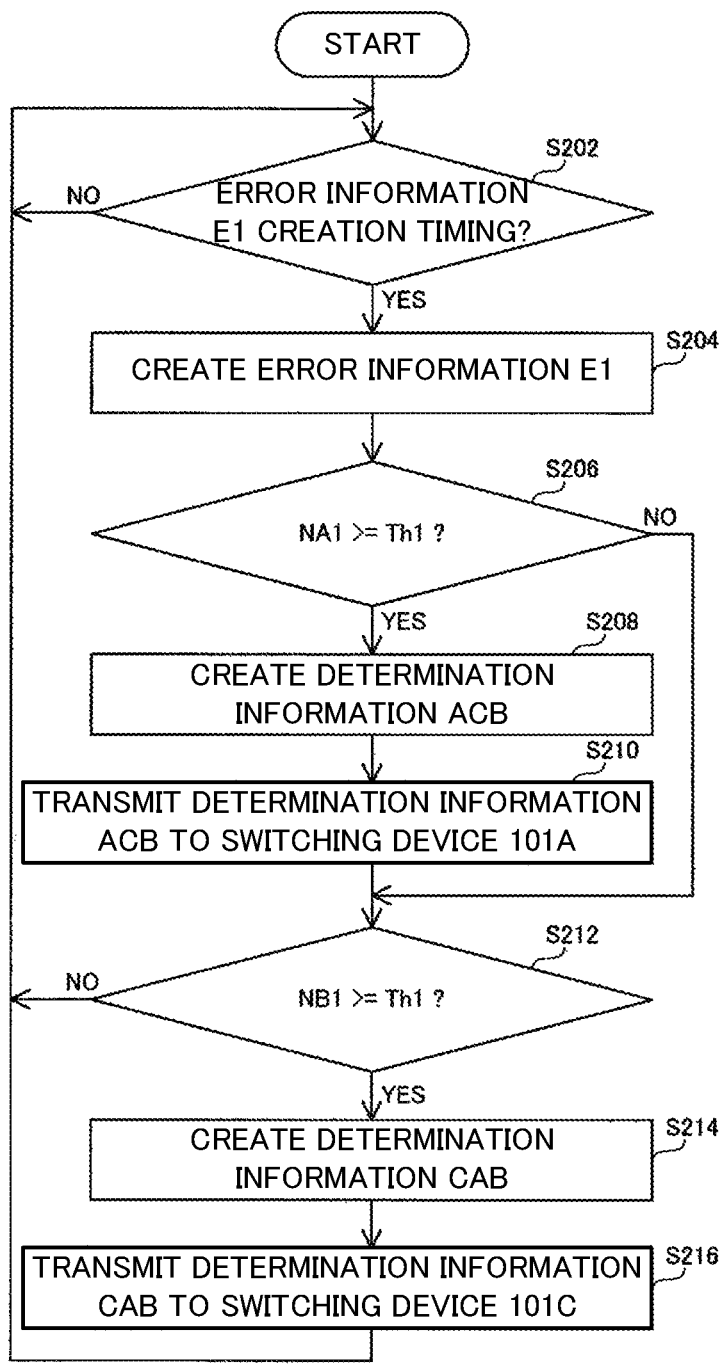
FIG. 8 is a flowchart of an operational procedure performed when the switching device in the on-vehicle communication system according to Embodiment 1 of the present disclosure performs creation and transmission of determination information.

FIG. 8 is a flowchart of an operational procedure performed when the switching device in the on-vehicle communication system according to Embodiment 1 of the present disclosure performs creation and transmission of determination information.

FIG. 8 shows a flow of operation of the switching device 101B that transmits and receives Ethernet frames at a communication rate of 100 Mbps.

Referring to FIG. 8, the switching device 101B is first standby until an error information E1 creation timing for each predetermined unit time is reached (NO at step S202).

The switching device 101B then totalizes the number of frames determined to be in error and creates error information E1 including the number of CRC errors (step S204) when the error information E1 creation timing is reached (YES at step S202). The error information E1 here is created for each port unit 33 of the switching device 101B.

Next, if the number of CRC errors NA1 included in the error information E1 created for the port unit 33A is equal to or more than the threshold Th1 (YES at step S206), the switching device 101B performs the following processing.

In other words, the switching device 101B determines that the communication route from the target device, i.e., the switching device 101A to the switching device 101B of its own is to be switched to a communication route from the switching device 101A to the switching device 101B of its own by way of the switching device 101C and creates determination information ACB indicating the determination result (step S208).

Then, the switching device 101B directly transmits the created determination information ACB to the switching device 101A, or transmits it to the switching device A by way of the switching device 101C (step S210).

Next, if the number of CRC errors NB1 included in the error information E1 created for the port unit 33B is equal to or more than the threshold Th1 (YES at step S212), the switching device 101B performs the following processing.

That is, the switching device 101B determines that the communication route from the target device, i.e., the switching device 101C to the switching device 101B of its own is to be switched to a communication route from the switching device 101C to the switching device 101B of its own by way of the switching device 101A and creates determination information CAB indicating the determination result (step S214).

Then, the switching device 101B directly transmits the created determination information CAB to the switching device 101C, or transmits it to the switching device 101C by way of the switching device 101A (step S216).

Subsequently, the switching device 101B is held standby until a new error information E1 creation timing is reached (NO at step S202).

Note that the order of the above-described steps S206-S210 and the above-described steps 212-S216 may be interchangeable, though the order is not limited to the above description.

Figure 9:
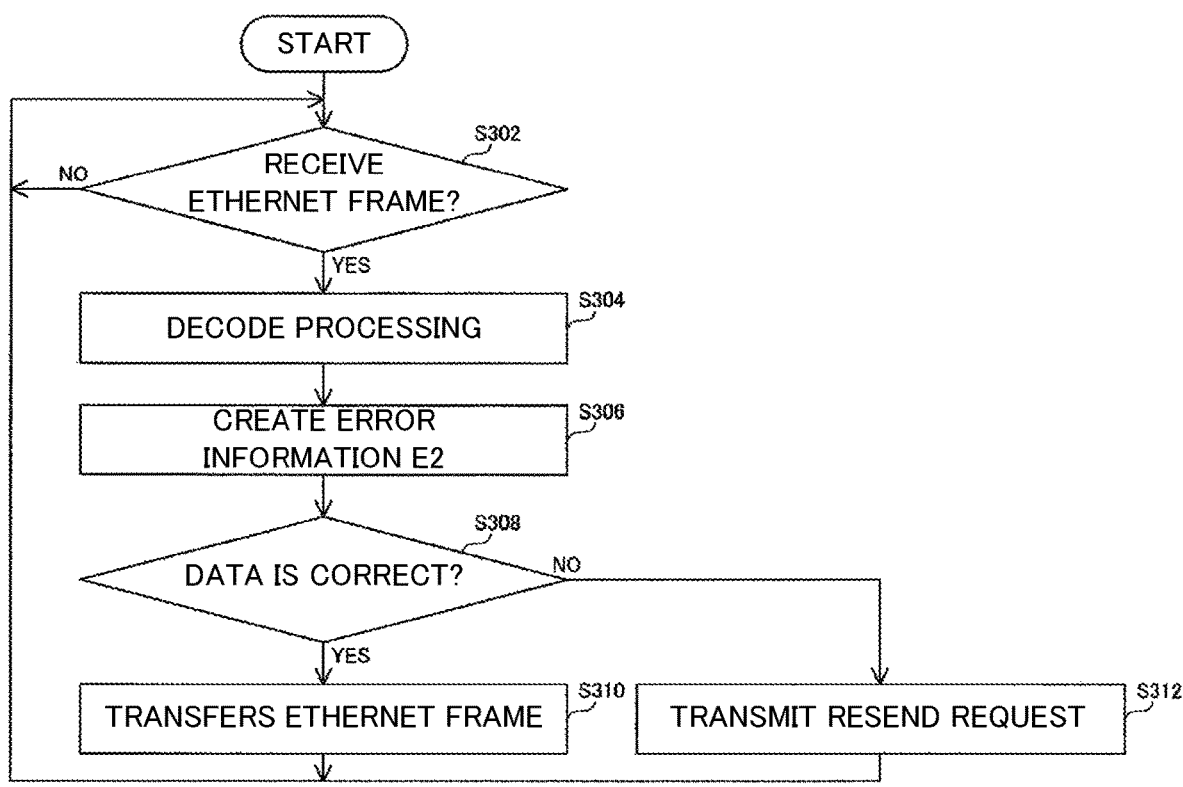
FIG. 9 is a flowchart of an operational procedure performed when the switching device in the on-vehicle communication system according to Embodiment 1 of the present disclosure creates error information.

FIG. 9 is a flowchart of an operational procedure performed when the switching device in the on-vehicle communication system according to Embodiment 1 of the present disclosure creates error information.

FIG. 9 illustrates a flow of operation in the switching device 101 that transmits and receives Ethernet frames at a communication rate of 1 Gbps.

Referring to FIG. 9, the switching device 101 is first held standby until it receives an Ethernet frame encoded by Reed-Solomon (204, 188) codes transmitted from a target device or the in-vehicle communication device 111 (NO at step S302).

When receiving an Ethernet frame encoded by Reed-Solomon (204, 188) codes from the target device or the in-vehicle communication device 111 (YES at step S302), the switching device 101 then performs decode processing for decoding the Reed-Solomon (204, 188) codes to precoding data (step S304).

Then, the switching device 101 creates the error information E2 including the number of error correcting times when decode processing is performed (step S306).

Next, the switching device 101 determines whether or not the data included in the Ethernet frame is correct by using the CRC value included in the decoded Ethernet frame (step S308).

If determining that the data included in the Ethernet frame is correct (YES at step S308), the switching device 101 transmits this Ethernet frame to another switching device 101 or the in-vehicle communication device 111, that is, transfers the Ethernet frame based on the destination MAC address included in the Ethernet frame (step S310).

Meanwhile, when determining that the data included in this Ethernet frame is in error (NO at step S308), the switching device 101 discards the Ethernet frame and transmits a resend request to the source device from which the Ethernet frame is transmitted (step S312).

Then, when transferring this Ethernet frame (step S310) or transmitting the resend request (step S312), the switching device 101 is held standby until it receives a new Ethernet frame encoded by Reed-Solomon (204, 188) codes from the target device or the in-vehicle communication device 111 (step S302 NO).

Figure 10:
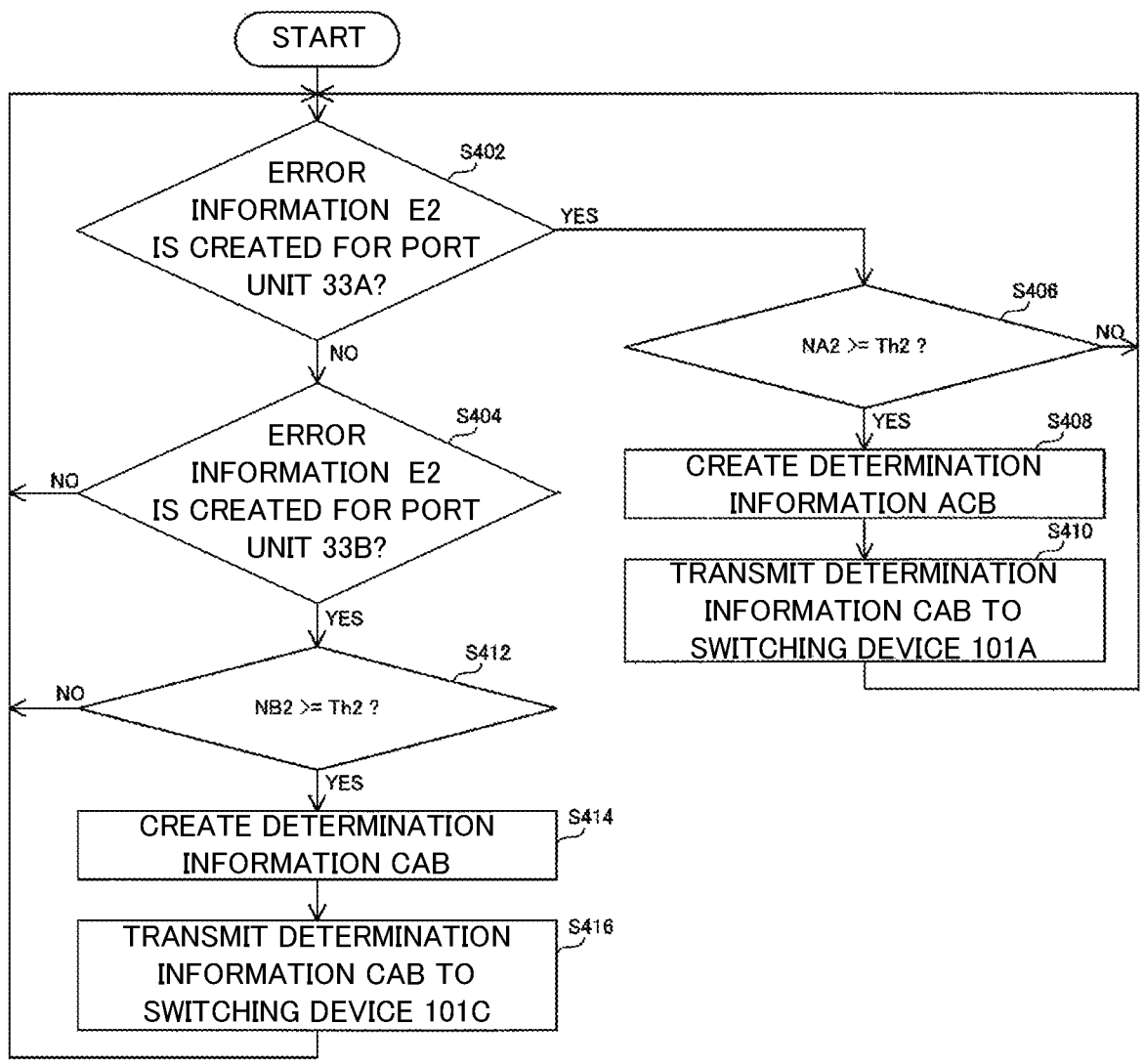
FIG. 10 is a flowchart of an operational procedure performed when the switching device in the on-vehicle communication system according to Embodiment 1 of the present disclosure performs creation and transmission of determination information.

FIG. 10 is a flowchart of an operational procedure performed when the switching device in the on-vehicle communication system according to Embodiment 1 of the present disclosure performs creation and transmission of determination information.

FIG. 10 illustrates a flow of operation in the switching device 101B that transmits and receives Ethernet frames at a communication rate of 1 Gbps.

Referring to FIG. 10, the switching device 101B is first held standby until error information E2 is created for the port unit 33A or 33B out of the multiple port units (NO at step S402 and NO at step S404).

If the error information E2 is created for the port unit 33A out of the multiple port units 33, and the number of error correcting times NA2 included in this error information E2 is equal to or more than the threshold Th2 (YES at step S402 and YES at step S406), the switching device 101B then performs the following processing.

That is, the switching device 101B determines that the communication route from the target device, i.e., the switching device 101A to the switching device 101B of its own is to be switched to a communication route from the switching device 101A to the switching device 101B of its own by way of the switching device 101C and creates the determination information ACB indicating the determination result (step S408).

Then, the switching device 101B directly transmits the created determination information ACB to the switching device 101A or transmits it to the switching device 101A by way of the switching device 101C (step S410).

Meanwhile, if the error information E2 is created for the port unit 33B out of the multiple port units 33, and the number of error correcting times NB2 included in this error information E2 is equal to or more than the threshold Th2 (NO at step S402, YES at step S404 and YES at step S412), the switching device 101B performs the following processing.

That is, the switching device 101B determines that the communication route from the target device, i.e., the switching device 101C to the switching device 101B of its own is to be switched to a communication route from the switching device 101C to the switching device 101B of its own by way of the switching device 101A and creates determination information CAB indicating the determination result (step S414).

Then, the switching device 101B directly transmits the created determination information CAB to the switching device 101C or transmits it to the switching device 101C by way of the switching device 101A (step S416).

Subsequently, if transmitting the determination information ACB to the switching device 101A (step S410), or if transmitting the determination information CAB to the switching device 101C (step S416), the switching device 101B is held standby until new error information E2 is created for the port unit 33A or 33B out of the multiple port units 33 (NO at step S402 and NO at step S404).

Note that the on-vehicle communication system according to Embodiment 1 of the present disclosure is configured to include, though not limited thereto, multiple switching devices 101 as on-vehicle devices. The on-vehicle communication system 301 may be configured to include multiple devices for relaying data such as a gateway device or the like as on-vehicle devices.

In the on-vehicle communication system according to Embodiment 1 of the present disclosure, the switching device 101 is configured to transmit and receive Ethernet frames at a communication rate of 100 Mbps or 1 Gbps, though the configuration is not limited thereto. The switching device 101 may be configured to transmit and receive Ethernet frames at a communication rate different from 100 Mbps and 1 Gbps.

Furthermore, in the on-vehicle communication system according to Embodiment 1 of the present disclosure, the frame processing unit 43 in the switching device 101 acquires error information. The determination unit 32 in the switching device 101 then performs determination processing based on the error information acquired by the frame processing unit 43.

The on-vehicle communication system 301, however, is not limited to such a configuration. That is, instead of the switching device 101, the on-vehicle device other than the switching device 101 in the on-vehicle communication system 301 may be configured to acquire error information and perform determination processing based on the error information.

In this case, the on-vehicle communication system 301 has an acquisition unit and a determination unit. The acquisition unit and the determination unit may be provided on the same on-vehicle device or different on-vehicle devices.

The acquisition unit acquires error information created by the frame processing unit 43 in the switching device 101B, for example. The determination unit performs determination processing based on the error information acquired by the acquisition unit. The determination unit then creates determination information ACB and CAB indicative of the determination results and transmits the created determination information ACB and CAB to the switching devices 101A and 101C, respectively.

Moreover, in the on-vehicle communication system according to Embodiment 1 of the present disclosure, the error information E1 is used though the error information is not limited thereto. In the on-vehicle communication system 301, the error information different from the error information E1 may be used.

Additionally, in the on-vehicle communication system according to Embodiment 1 of the present disclosure, the source and the destination of Ethernet frames are, though not limited to, the in-vehicle communication devices 111. In the on-vehicle communication system 301, at least one of the source and the destination of Ethernet frames may be the switching device 101.

Meanwhile, applying the redundant configuration described in Japanese Patent Application Laid-Open No. 2016-12932 to an on-vehicle network is conceivable. Due to limitation of space in a vehicle, however, a noise source such as an engine, a motor and so on may be arranged close to signal lines.

Such an arrangement may sharply deteriorate a communication environment depending on the operation of the noise source. For example, the noise level of a signal conveyed through a signal line may sharply be increased, which may prevent the data from being conveyed correctly. Thus, a technique capable of appropriately performing redundant switching in the on-vehicle network with small loss of data is required.

On the contrary thereto, in the on-vehicle communication system according to Embodiment 1 of the present disclosure, the frame processing unit 43 in the port unit 33A of the switching device 101B acquires error information E1 or E2 concerning an error of data received by the switching device 101B of itself from the switching device 101A. The determination unit 32 then performs determination processing for determining whether or not a communication route from the switching device 101A to the switching device 101B of itself is to be switched to another communication route from the switching device 101A to the switching device 101B by way of the switching device 101C based on the error information E1 or E2 acquired by the frame processing unit 43.

By such a configuration, it is possible to recognize whether or not loss of data conveyed in a route from the switching device 101A to the switching device 101B occurs, or whether or not loss of such data is likely to occur, based on the error information E1 or E2, for example. This makes it possible to determine that the communication route is to be switched to another communication route at an appropriate timing when data loss occurs, when data loss is likely to occur or the like. Accordingly, it is possible to appropriately perform redundant switching in the on-vehicle network with small loss of data.

Furthermore, in the on-vehicle communication system according to Embodiment 1 of the present disclosure, the error information E1 includes the number of errors of the data.

Such a configuration makes it possible to more correctly recognize whether or not loss of data conveyed through a route from the switching device 101A to the switching device 101B occurs based on the number of errors.

Moreover, in the on-vehicle communication system according to Embodiment 1 of the present disclosure, the error information E2 includes the number of error corrections in error correction processing performed by the switching device 101B.

Such a configuration makes it possible to recognize a sign of occurrence of data loss based on the number of error corrections, so that it is possible to more correctly recognize whether or not loss of data conveyed through the route from the switching device 101A to the switching device 101B is likely to occur. This enables redundant switching before data loss occurs.

Additionally, in the on-vehicle communication system according to Embodiment 1 of the present disclosure, the determination unit 32 compares a value included in the error information E1 or E2 with a predetermined threshold and performs the determination processing based on a comparison result.

Such a configuration makes it possible to easily recognize whether or not loss of data conveyed in the route from the switching device 101A to the switching device 101B occurs, or whether or not loss of such data is likely to occur, for example.

In addition, in the switching device 101B according to Embodiment 1 of the present disclosure, a reception unit 41 receives data from a target device being another switching device 101. The frame processing unit 43 creates error information E1 or E2 concerning an error of the data received by the reception unit 41. The determination unit 32 then determines whether or not a communication route from the target device to the switching device 101B of itself is to be switched to another communication route from the target device to the switching device 101B of itself by way of another switching device 101 except for the above said another switching device 101 based on the error information E1 or E2 created by the frame processing unit 43.

By such a configuration, it is possible to recognize whether or not loss of data conveyed in a route from the target device to the switching device 101B of itself occurs, or whether or not loss of such data is likely to occur, based on the error information E1 or E2, for example. This makes it possible to determine that the communication route is to be switched to another communication route at an appropriate timing when data loss occurs, when data loss is likely to occur or the like. Accordingly, it is possible to appropriately perform redundant switching in the on-vehicle network with small loss of data.

The following describes another embodiment of the present disclosure with reference to the drawings thereof. Note that the same or corresponding parts will be denoted by the same reference codes in the drawings and will not be repeatedly described here.

Embodiment 2

The present embodiment relates to an on-vehicle communication system different from the on-vehicle communication system according to Embodiment 1 in that a switching device that creates error information and a switching device that performs determination processing are different from each other. The details other than the following description are similar to those of the on-vehicle communication system according to Embodiment 1.

Figure 11:
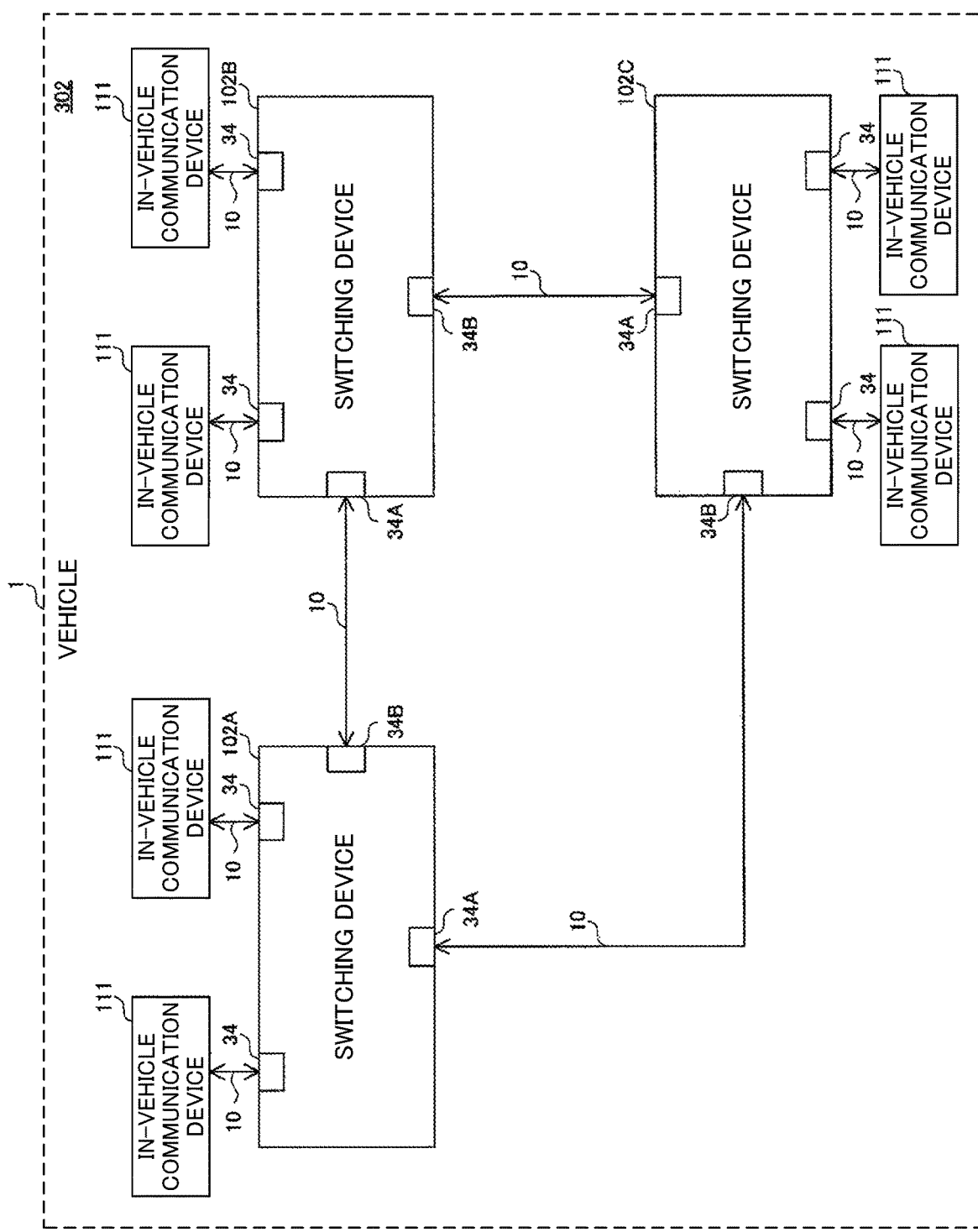
FIG. 11 is a figure illustrating an example of a connection between switching devices in an on-vehicle communication system according to Embodiment 2 of the present disclosure.

FIG. 11 is a figure illustrating an example of a connection between switching devices in an on-vehicle communication system according to Embodiment 2 of the present disclosure.

Referring to FIG. 11, an on-vehicle communication system 302 includes switching devices (on-vehicle devices) 102A, 102B and 102C. Each of the switching devices 102A, 102B and 102C may also be called a switching device 102.

The on-vehicle communication system 302 is mounted on a vehicle 1. Furthermore, six in-vehicle communication devices 111 are mounted on the vehicle 1.

Note that the on-vehicle communication system 302 may include two, or four or more switching devices 102, though not limited to include three switching devices 102.

The in-vehicle communication device 111 in the on-vehicle communication system 302 operates similarly to the in-vehicle communication device 111 in the on-vehicle communication system 301 as illustrated in FIG. 1.

FIG. 11 illustrates for each of the switching devices 102A-102C, communication ports 34A and 34B used for communication between the switching devices 102 as well as two communication ports 34 used for communication between the switching device 102 and the in-vehicle communication device 111.

The communication port 34B of the switching device 102A is connected to the communication port 34A of the switching device 102B through an Ethernet cable 10. The communication port 34B of the switching device 102B is connected to the communication port 34A of the switching device 102C through an Ethernet cable 10. Furthermore, the communication port 34B of the switching device 102C is connected to the communication port 34A of the switching device 102A through an Ethernet cable 10.

[Configuration of Switching Device 102]

Figure 12:
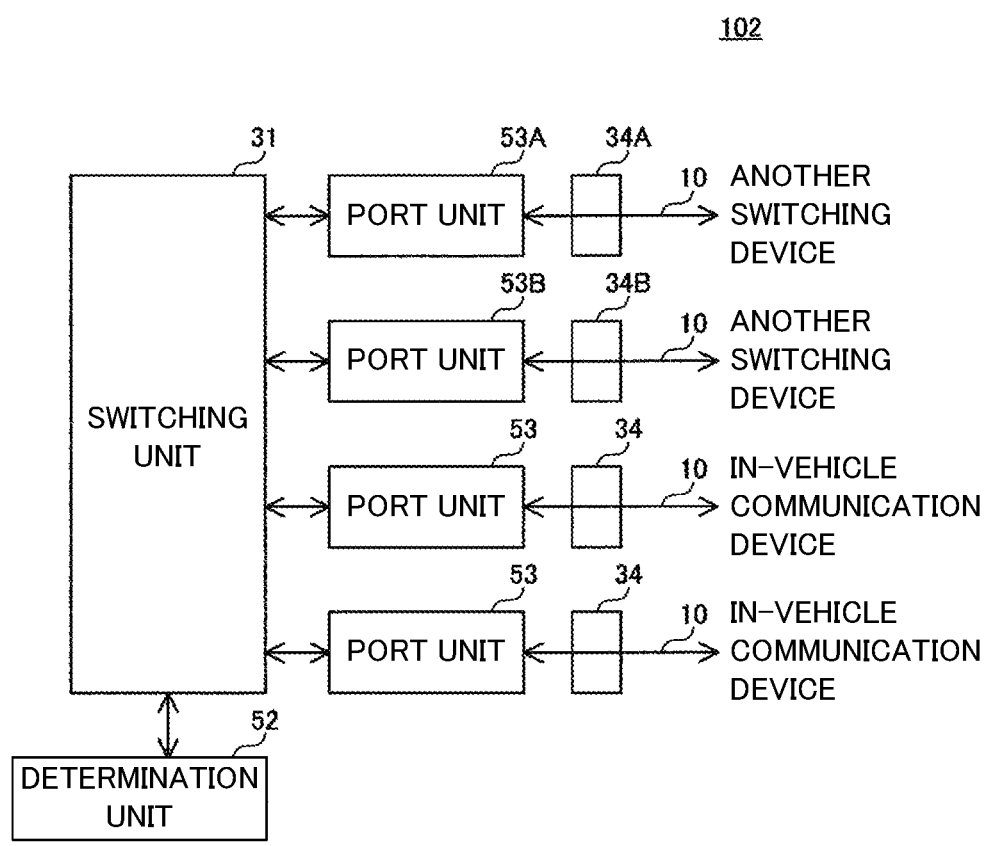
FIG. 12 is a figure illustrating the configuration of a switching device in the on-vehicle communication system according to Embodiment 2 of the present disclosure.

FIG. 12 is a figure illustrating the configuration of a switching device in the on-vehicle communication system according to Embodiment 2 of the present disclosure.

Referring to FIG. 12, the switching device 102 includes a switching unit 31, four communication ports 34, a determination unit 52 and four port units 53.

The port unit 53 is provided in correspondence with the communication port 34. The port unit 53 and the corresponding communication port 54 are assigned with a unique port number.

Note that the switching device 102 may have three, or five or more pairs of communication ports 53 and communication ports 54 though not limited to have four pairs of communication ports 53 and communication ports 54.

The switching unit 31 and the communication port 34 in the switching device 102 respectively operate similarly to the switching device 31 and the communication port 34 in the switching device 101 illustrated in FIG. 2.

In this example, the communication ports 34A and 34B, which are examples of the communication ports 34, are connected to other switching devices 102 through Ethernet cables 10. The two communication ports 34 except for the communication ports 34A and 34B out of the four communication ports 34 are connected to the in-vehicle communication devices 111 through Ethernet cables 10. Furthermore, port units 53A and 53B, which are examples of the port units 53, correspond to the communication ports 34A and 34B, respectively.

Figure 13:
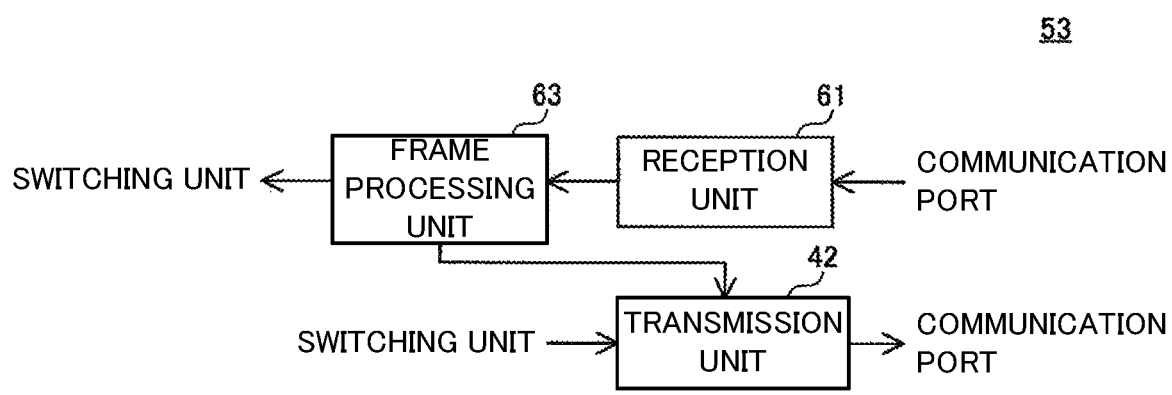
FIG. 13 is a figure illustrating the configuration of a port unit of the switching device according to Embodiment 2 of the present disclosure.

FIG. 13 is a figure illustrating the configuration of a port unit of the switching device according to Embodiment 2 of the present disclosure.

Referring to FIG. 13, the port unit 53 includes a transmission unit 42, a reception unit (acquisition unit) 61 and a frame processing unit (creation unit) 63.

The reception unit 61 and the transmission unit 42 in the port unit 53 operate similarly to the reception unit 41 and the transmission unit 42 in the port unit 33 illustrated in FIG. 3, respectively.

If Ethernet frames are transmitted and received at a communication rate of 100 Mbps in accordance with a predetermined communication standard, for example, the port unit 53 performs the following processing.

That is, when receiving an electrical signal from another switching device 102, that is, the target device or the in-vehicle communication device 111 that is connected through the corresponding communication port 34, the reception unit 61 of the port unit 53 demodulates the electrical signal in accordance with a predetermined modulation technique to thereby generate a string of symbols. The reception unit 61 outputs the generated string of symbols to the frame processing unit 63.

When receiving the string of symbols from the reception unit 61, the frame processing unit 63 converts the received string of symbols into a bit string. The converted bit string here indicates an Ethernet frame.

The frame processing unit 63 acquires a CRC value from the converted bit string, i.e., the FCS field of the Ethernet frame.

Furthermore, the frame processing unit 63 calculates a CRC value of the data included in the Ethernet frame and compares, that is, checks the calculated CRC value with the acquired CRC value.

If these CRC values match with each other, the frame processing unit 63 determines that the data is correct and outputs this Ethernet frame to the switching unit 31.

If, on the other hand, these CRC values do not match with each other, the frame processing unit 63 determines that the data is in error, discards the Ethernet frame and transmits a resend request of the Ethernet frame to the target device or the in-vehicle communication device 111 via the transmission unit 42, for example.

For example, if the communication ports 34A and 34B in the switching device 102 are employed as dedicated communication ports 34 connected to the target devices, error information is created for each of the port units 53A and 53B. Meanwhile, no error information E1 is created for the other two port units 53.

More specifically, the frame processing unit 63 in each of the port units 53A and 53B totalizes the number of frames that are determined to be in error every time a predetermined unit of time has elapsed, and creates error information E1 including the totalized result, that is, the number of CRC errors, for example. The frame processing unit 43 outputs an Ethernet frame including the created error information E1 to the target device via the transmission unit 42.

[Determination Processing]

The determination processing performed in the switching device 102A will be described below whereas similar determination processing is also performed in each of the switching devices 102B and 102C.

Referring again to FIGS. 11 and 13, for the switching device 102A, the reception unit 61 in the port unit 53B acquires error information E1 concerning an error of the data received by the switching device 102B from the switching device 102A of its own.

More specifically, when receiving an Ethernet frame including the error information E1, the reception unit 61 outputs the received Ethernet frame to the switching unit 31 via the frame processing unit 63.

When receiving the Ethernet frame from the port unit 53B, the switching unit 31 acquires the error information E1 from the received Ethernet frame and outputs the acquired error information E1 together with the port number of the port unit 53B to the determination unit 52.

The reception unit 61 in the port unit 53A acquires error information E1 concerning an error of the data received by the switching device 102C from the switching device 102A of its own.

More specifically, when receiving the Ethernet frame including the error information E1, the reception unit 61 outputs the received Ethernet frame to the switching unit 31 by way of the frame processing unit 63.

When receiving the Ethernet frame from the port unit 53A, the switching unit 31 acquires the error information E1 from the received Ethernet frame and outputs the acquired error information E1 together with the port number of the port unit 53A to the determination unit 52.

The determination unit 52 performs determination processing for determining whether or not the communication route from the switching device 102A of its own to the switching device 102B is to be switched to another communication route from the switching device 102A of its own to the switching device 102B by way of the switching device 102C based on the error information E1 acquired by the reception unit 61 in the port unit 53B.

More specifically, the determination unit 52 receives the error information E1 and the port number of the port unit 53B from the port unit 53B, and recognizes that the error information E1 is received by the port unit 53B based on the received port number of the port unit 53B.

If the number of CRC errors included in the received error information E1 is equal to or more than the threshold Th1, the determination unit 52 determines that the communication route from the switching device 102A of its own to the switching device 102B is to be switched to a communication route from the switching device 102A of its own to the switching device 102B by way of the switching device 102C.

The determination unit 52 then rewrites the ARL table held by the switching unit 31 based on the determination result.

Furthermore, the determination unit 52 performs determination processing for determining whether or not the communication route from the switching device 102A of its own to the switching device 102C is to be switched to another communication route from the switching device 102A of its own to the switching device 102C by way of the switching device 102B based on the error information E1 acquired by the reception unit 61 of the port unit 53A.

More specifically, the determination unit 52 receives the error information E1 and the port number of the port unit 53A from the port unit 53A, and recognizes that the error information E1 is received by the port unit 53A based on the received port number of the port unit 53A.

If the number of CRC errors included in the received error information E1 is equal to or more than the threshold Th1, the determination unit 52 determines that the communication route from the switching device 102A of its own to the switching device 102C is to be switched to a communication route from the switching device 102A of its own to the switching device 102C by way of the switching device 102B.

The determination unit 52 then rewrites the ARL table held by the switching unit 31 based on the determination result.

Alternatively, if both of the number of CRC errors included in the error information E1 received by the port unit 53B and the number of CRC errors included in the error information E1 received by the port unit 53A are equal to or more than the threshold Th1, the determination unit 52 performs the following processing.

That is, the determination unit 52 does not use the error information E1 being less in the number of CRC errors, for example.

More specifically, if the number of CRC errors included in the error information E1 received by the port unit 53A is less than the number of CRC errors included in the error information E1 received by the port unit 53B, the determination unit 52 uses the error information E1 received by the port unit 53B while it does not use the error information E1 received by the port unit 53A.

The determination unit 32 then determines that the communication route from the switching device 102A of its own to the switching device 102B is to be switched to a communication route from the switching device 101A of its own to the switching device 101B by way of the switching device 101C while it does not determine that the communication route from the switching device 101A of its own to the switching device 101C is to be switched to a communication route from the switching device 101A of its own to the communication route 101C by way of the switching device 101B.

Note that if both of the number of CRC errors included in the error information E1 received by the port unit 53B and the number of CRC errors included in the error information E1 received by the port unit 53A are equal to or more than the threshold Th1, the determination unit 32 may be configured not to determine the switching of the communication route.

[Modification of Switching Device 102]

Referring again to FIG. 12, the switching device 102 is not limited to transmit and receive Ethernet frames at a communication rate of 100 Mbps in accordance with a predetermined communication standard. The switching device 101 may transmit and receive Ethernet frames at a communication rate of 1 Gbps.

In this example, in a destination device to which an Ethernet frame is to be transmitted, a forward error correction (FEC) and a CRC check are performed.

Referring again to FIG. 13, the reception unit 61 and the transmission unit 42 in the modification of the switching device 102 operate similarly to the reception unit 41 and the transmission unit 42 in the modification of the above-described switching device 101, respectively.

When receiving an electrical signal from the target device or the in-vehicle communication device 111 that is connected through the corresponding communication port 34, the reception unit 61 demodulates the electrical signal in accordance with the modulation technique of PAM3 to thereby generate a string of symbols. The reception unit 61 outputs the generated string of symbols to the frame processing unit 63.

More specifically, when receiving the string of symbols from the reception unit 61, the frame processing unit 63 converts the received string of symbols, i.e., multiple Reed-Solomon (204, 188) codes into multiple pre-coding data.

The frame processing unit 63 combines the converted multiple pre-coding data with each other to generate a string of symbols and converts the generated string of symbols to a bit string. Here, the converted bit string represents an Ethernet frame of 1518 bytes in size.

The frame processing unit 63 acquires a CRC value from the converted bit string, i.e., the FCS field of the Ethernet frame.

Furthermore, the frame processing unit 63 calculates a CRC value of the data included in the Ethernet frame and compares, that is, checks the calculated CRC value with the acquired CRC value.

If these CRC values match with each other, the frame processing unit 63 outputs the Ethernet frame to the switching unit 31.

If, on the other hand, these CRC values do not match with each other, the frame processing unit 43 transmits a resend request of the Ethernet frame to the target device or the in-vehicle communication device 111 via the transmission unit 42, for example.

For example, if the communication ports 34A and 34B in the switching device 102 are employed as dedicated communication ports 34 connected to the target devices, error information E2 is created for each of the port units 53A and 53B. Meanwhile, for the other two port units 53, no error information E2 is created.

More specifically, when converting multiple Reed-Solomon (204, 188) codes into multiple pre-coding data, the frame processing unit 63 in each of the port units 53A and 53B records the total number of error correcting times and creates the error information E2 including the recorded total number of error correcting times, i.e., the number of error correcting times.

The frame processing unit 63 outputs an Ethernet frame including the created error information E2 to the target device by way of the transmission unit 42.

Referring again to FIGS. 11-13, determination processing performed in the switching device 102A will be described below whereas similar determination processing is also performed in each of the switching devices 102B and 102C.

For the switching device 102A, the reception unit 61 in the port unit 53B acquires error information E2 concerning an error of the data that received by the switching device 102B from the switching device 102A of its own.

More specifically, when receiving the Ethernet frame including the error information E2, the reception unit 61 outputs the received Ethernet frame to the switching unit 31 via the frame processing unit 63.

When receiving the Ethernet frame from the port unit 53B, the switching unit 31 acquires the error information E2 from the received Ethernet frame and outputs the acquired error information E2 together with the port number of the port unit 53B to the determination unit 52.

The reception unit 61 in the port unit 53A further acquires error information E2 concerning an error of the data received by the switching device 102C from the switching device 102A of its own.

More specifically, when receiving the Ethernet frame including the error information E2, the reception unit 61 outputs the received Ethernet frame to the switching unit 31 via the frame processing unit 63.

When receiving the Ethernet frame from the port unit 53B, the switching unit 31 acquires the error information E2 from the received Ethernet frame and outputs the acquired error information E2 together with the port number of the port unit 53B to the determination unit 52.

The determination unit 52 performs determination processing for determining whether or not the communication route from the switching device 102A of its own to the switching device 102B is to be switched to another communication route from the switching device 102A of its own to the switching device 102B by way of the switching device 102C based on the error information E2 acquired by the reception unit 61 in the port unit 53B.

More specifically, the determination unit 52 receives the error information E2 and the port number of the port unit 53B from the port unit 53B, and recognizes that the error information E2 is received by the port unit 53B based on the received port number of the port unit 53B.

If the number of error correcting times included in the received error information E2 is equal to or more than a threshold Th2, the determination unit 52 determines that the communication route from the switching device 102A of its own to the switching device 102B is to be switched to a communication route from the switching device 102A of its own to the switching device 102B by way of the switching device 102C.

The determination unit 52 then rewrites the ARL table held by the switching unit 31 based on the determination result.

Furthermore, the determination unit 52 determines whether or not the communication route from the switching device 102A of its own to the switching device 102C is to be switched to another communication route from the switching device 102A of its own to the switching device 102C by way of the switching device 102B based on the error information E2 acquired by the reception unit 61 in the port unit 53A.

More specifically, the determination unit 52 receives the error information E2 and the port number of the port unit 53A from the port unit 53A, and recognizes that the error information E2 is received by the port unit 53A based on the received port number of the port unit 53A.

If the number of error correcting times included in the received error information E2 is equal to or more than the threshold Th2, the determination unit 52 determines that the communication route from the switching device 102A of its own to the switching device 102C is to be switched to a communication route from the switching device 102A of its own to the switching device 102C by way of the switching device 102B.

The determination unit 52 then rewrites the ARL table held by the switching unit 31 based on the determination result.

Alternatively, if both of the number of error correcting times included in the error information E2 received by the port unit 53B and the number of error correcting times included in the error information E2 received by the port unit 53A are more than the threshold Th2, the determination unit 52 performs the following processing.

That is, the determination unit 52 does not use the error information E2 being less in the number of error correcting times, for example.

More specifically, if the number of error correcting times included in the error information E2 received by the port unit 53A is less than the number of error correcting times included in the error information E2 received by the port unit 53B, the determination unit 52 uses the error information E2 received by the port unit 53B while it does not use the error information E2 received by the port unit 53A.

The determination unit 32 then determines that the communication route from the switching device 102A of its own to the switching device 102B is to be switched to a communication route from the switching device 102A of its own to the switching device 102B by way of the switching device 102C while it does not determine that the communication route from the switching device 102A of its own to the switching device 102C is to be switched to a communication route from the switching device 102A of its own to the communication route 102C by way of the switching device 102B.

Note that if both of the number of error correcting times included in the error information E2 received by the port unit 53B and the number of error correcting times included in the error information E2 received by the port unit 53A are equal to or more than the threshold Th2, the determination unit 52 may be configured not to determine the switching of the communication route.

Hence, in the on-vehicle communication system according to Embodiment 2 of the present disclosure, the reception unit 61 in the port unit 53B of the switching device 101A acquires the error information E1 or E2 concerning the error of the data received by the switching device 101B from the switching device 101A of itself. The determination unit 52 in the switching device 101A then performs determination processing for determining whether or not a communication route from the switching device 101A of itself to the switching device 101B is to be switched to another communication route from the switching device 101A to the switching device 101B by way of the switching device 101C based on the error information E1 or E2 acquired by the reception unit 61.

By such a configuration, it is possible to recognize whether or not loss of data conveyed in a route from the switching device 101A to the switching device 101B occurs, or whether or not loss of such data is likely to occur, based on the error information E1 or E2, for example. This makes it possible to determine that the communication route is to be switched to another communication route at an appropriate timing when data loss occurs, when data loss is likely to occur or the like. Accordingly, it is possible to appropriately perform redundant switching in the on-vehicle network with small loss of data.

Since the other configurations and operation are similar to those of the on-vehicle communication system according to Embodiment 1, the detailed description thereof will not be repeated here.

Noted that parts or all of the components and operation of the devices according to Embodiment 1 and Embodiment 2 of the present disclosure may appropriately be combined.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

The above description includes features of the clauses described below.

1. An on-vehicle communication system mounted on a vehicle, comprising:

a plurality of on-vehicle devices including a first on-vehicle device and a second on-vehicle device;

an acquisition unit that acquires error information concerning an error of data received by the first on-vehicle device from the second on-vehicle device; and a determination unit that performs determination processing of determining whether or not a communication route from the second on-vehicle device to the first on-vehicle device is to be switched to another communication route from the second on-vehicle device to the first on-vehicle device by way of another one of the on-vehicle devices, based on the error information acquired by the acquisition unit, wherein the on-vehicle device is a switching device or a gateway device, the data is included in an Ethernet frame received by the first on-vehicle device from the second on-vehicle device, the acquisition unit acquires error information including the number of cyclic redundancy check (CRC) errors in a plurality of the Ethernet frames received per predetermined unit time or error information including the number of error correcting times per frame by forward error correction, the on-vehicle communication system includes three on-vehicle devices, the determination unit performs the determination processing of determining whether or not a communication route from the second on-vehicle device to the first on-vehicle device is to be switched to another communication route from the second on-vehicle device to the first on-vehicle device by way of a third on-vehicle device, based on the error information acquired by the acquisition unit.

2. The on-vehicle communication system according to 1, wherein the determination unit compares a value included in the error information and a predetermined threshold based on an error correction capability and performs the determination processing based on a comparison result.

3. An on-vehicle device mounted on a vehicle, comprising:

a reception unit that receives data from a target device being another on-vehicle device mounted on the vehicle;

a creation unit that creates error information concerning an error of the data received by the reception unit; and a determination unit that determines whether or not a communication route from the target device to the on-vehicle device of itself is to be switched to another communication route from the target device to the on-vehicle device of itself by way of another on-vehicle device mounted on the vehicle except for the above said another on-vehicle device, based on the error information created by the creation unit, wherein the on-vehicle device is a switching device or a gateway device, the data is included in an Ethernet frame received from the target device, and the creation unit creates error information including the number of CRC errors in a plurality of the Ethernet frames received per predetermined unit time or error information including the number of error correcting times per frame by forward error correction.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An on-vehicle communication system, comprising:
a plurality of on-vehicle devices including a first on-vehicle device, a second on-vehicle device and a third on-vehicle device;
an acquisition unit that acquires first error information concerning an error of data received by the first on-vehicle device from the second on-vehicle device and second error information concerning an error of data received by the first on-vehicle device from the third on-vehicle device; and
a determination unit that performs determination processing of determining whether or not a communication route from the second on-vehicle device to the first on-vehicle device is to be switched to another communication route from the second on-vehicle device to the first on-vehicle device by way of the third on-vehicle device, based on the first error information and the second error information that are acquired by the acquisition unit, wherein
the determination unit performs first comparison processing of comparing a value included in the first error information with a predetermined threshold and comparing a value included in the second error information with a predetermined threshold, performs a second comparison processing of comparing the value included in the first error information with the value included in the second error information in a case where a result of the first comparison processing satisfies a predetermined condition, and determines the communication route to be used as a result of switching based on a result of the second comparison processing.

2. The on-vehicle communication system according to claim 1, wherein the error information includes the number of errors of the data.

3. The on-vehicle communication system according to claim 1, wherein the error information includes the number of error corrections in error correction processing performed by the first on-vehicle device.

4. An on-vehicle device, comprising:
a reception unit that receives data from a target device being another on-vehicle device and data from another on-vehicle device;
a creation unit that creates first error information concerning an error of the data received by the reception unit from the target device and second error information concerning an error of the data received by the reception unit from said another on-vehicle device; and
a determination unit that performs determination processing as to whether or not a communication route from the target device to the on-vehicle device itself is to be switched to another communication route from the target device to the on-vehicle device itself by way of said another on-vehicle device, based on the first error information and the second error information that are created by the creation unit, wherein
the determination unit performs first comparison processing of comparing a value included in the first error information with a predetermined threshold and comparing a value included in the second error information with a predetermined threshold, performs a second comparison processing of comparing the value included in the first error information with the value included in the second error information in a case where a result of the first comparison processing satisfies a predetermined condition, and determines the communication route to be used as a result of switching based on a result of the second comparison processing.

5. A communication control method in an on-vehicle communication system that includes a plurality of on-vehicle devices including a first on-vehicle device, a second on-vehicle device and a third on-vehicle device, an acquisition unit and a determination unit, comprising:
acquiring by the acquisition unit first error information concerning an error of data received by the first on-vehicle device from the second on-vehicle device and second error information concerning an error of data received by the first on-vehicle device from the third on-vehicle device; and performing, by the determination unit, determination processing of determining whether or not a communication route from the second on-vehicle device to the first on-vehicle device is to be switched to another communication route from the second on-vehicle device to the first on-vehicle device by way of the third on-vehicle device, based on the first error information and the second error information that are acquired by the acquisition unit, wherein in the step of performing the determination processing, first comparison processing of comparing a value included in the first error information with a predetermined threshold and comparing a value included in the second error information with a predetermined threshold is performed, a second comparison processing of comparing the value included in the first error information with the value included in the second error information is performed in a case where a result of the first comparison processing satisfies a predetermined condition, and the communication route to be used as a result of switching is determined based on a result of the second comparison processing.

* * * * *